(12) United States Patent
Trento

(10) Patent No.: US 12,553,698 B2
(45) Date of Patent: Feb. 17, 2026

(54) TEMPLATE MEASUREMENT APPARATUS

(71) Applicant: Todd Trento, Concord, NH (US)

(72) Inventor: Todd Trento, Concord, NH (US)

(73) Assignee: Todd Trento, Concord, NH (US)

( * ) Notice: Subject to any disclaimer, the term of this patent is extended or adjusted under 35 U.S.C. 154(b) by 389 days.

(21) Appl. No.: 18/149,019

(22) Filed: Dec. 30, 2022

(65) Prior Publication Data

US 2024/0219162 A1 Jul. 4, 2024

(51) Int. Cl.
*G01B 3/14* (2006.01)
*E04F 21/18* (2006.01)

(52) U.S. Cl.
CPC ............... *G01B 3/14* (2013.01); *E04F 21/18* (2013.01)

(58) Field of Classification Search
CPC ............ G01B 3/14; E04F 21/04; E04F 21/18
USPC ............................ 33/526, 528, 809, DIG. 10
See application file for complete search history.

(56) References Cited

U.S. PATENT DOCUMENTS

| | | | | |
|---|---|---|---|---|
| 3,116,563 A * | 1/1964 | Gelbman | ............... | H02G 3/18 33/371 |
| 3,842,510 A * | 10/1974 | Elliott | ............... | G01B 3/1084 33/528 |
| 3,875,669 A * | 4/1975 | Hull | ............... | H02G 3/125 D10/64 |
| 5,129,297 A * | 7/1992 | Bussi | ............... | H02G 1/00 33/528 |
| 5,222,303 A * | 6/1993 | Jardine | ............... | G01B 3/02 33/528 |
| 5,361,509 A * | 11/1994 | Wheeler, Sr. | ............... | H02G 1/00 33/528 |
| 5,491,901 A * | 2/1996 | Parrino | ............... | H02G 3/126 33/528 |
| 5,507,098 A * | 4/1996 | Schaver, Jr. | ............... | H02G 1/00 33/DIG. 10 |
| 5,615,490 A * | 4/1997 | Burchell | ............... | H02G 1/00 33/528 |
| 5,813,130 A * | 9/1998 | MacDowell | ............... | H02G 1/00 33/528 |
| 5,860,219 A * | 1/1999 | Wilkinson | ............... | H02G 1/00 33/528 |
| 5,921,522 A * | 7/1999 | Weber | ............... | H02G 1/00 269/904 |

(Continued)

*Primary Examiner* — George B Bennett
(74) *Attorney, Agent, or Firm* — Procopio, Cory, Hargreaves & Savitch LLP

(57) ABSTRACT

A template measurement tool for counter/backsplash template measurements, comprising: a planar base piece; and an extension configured to extend from the planar base piece and in a direction perpendicular to the planar base piece to provide a measurement surface for a measurement in connection with the counter or the backsplash template. A template measurement kit comprising: a first template measurement tool comprising: a first planar base piece and a planar extension configured to extend from the first planar base piece and in a direction perpendicular to the first planar base piece to provide a first measurement surface for a first measurement in connection with a counter or a backsplash template; and a second template measurement tool comprising: a second planar base piece and a rounded extension extending from the second planar base piece to provide a second measurement surface for a second counter or backsplash measurement.

20 Claims, 22 Drawing Sheets

(56) References Cited

U.S. PATENT DOCUMENTS

| | | | | |
|---|---|---|---|---|
| 5,931,425 A * | 8/1999 | Oliva | H02G 3/125 | 33/528 |
| 6,279,239 B1 * | 8/2001 | Astudillo | G01C 15/002 | 33/285 |
| 6,463,668 B1 * | 10/2002 | Williams | H02G 1/00 | 33/528 |
| 6,857,197 B2 * | 2/2005 | Hicks | H02G 1/00 | 33/528 |
| 7,103,983 B2 * | 9/2006 | Lehavi | A61B 5/1072 | 446/124 |
| 7,200,951 B2 * | 4/2007 | O'Connor | H02G 1/00 | 33/528 |
| 7,367,131 B1 * | 5/2008 | Hordis | H02G 3/12 | 324/67 |
| 7,373,730 B2 * | 5/2008 | Murphy | H02G 1/00 | 33/528 |
| 7,434,326 B2 * | 10/2008 | Gifford | H02G 3/126 | 33/528 |
| 7,454,844 B1 * | 11/2008 | Ruby | B26F 1/32 | 33/528 |
| 7,509,750 B2 * | 3/2009 | Cameron | H02G 3/00 | D10/64 |
| 7,845,089 B1 * | 12/2010 | Lavalle | H02G 3/12 | 33/528 |
| 7,935,887 B2 * | 5/2011 | Petak | H02G 1/00 | 174/67 |
| 8,418,373 B2 * | 4/2013 | Swanson | G01B 5/004 | 33/1 G |
| 8,887,402 B2 * | 11/2014 | Doppel | A61B 5/1072 | 33/2 A |
| 8,943,704 B1 * | 2/2015 | Scammel | B25H 7/04 | 33/528 |
| 2008/0148586 A1 * | 6/2008 | Morin | H02G 3/125 | 33/528 |
| 2012/0096724 A1 * | 4/2012 | Eyermann | G01B 3/00 | 33/354 |
| 2012/0186094 A1 * | 7/2012 | Cornelius | B43L 13/201 | 33/528 |

\* cited by examiner

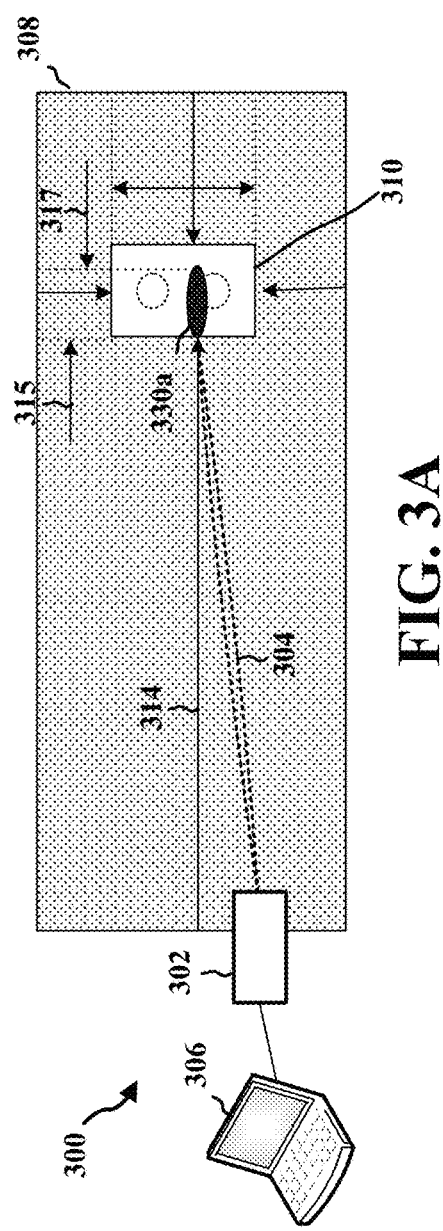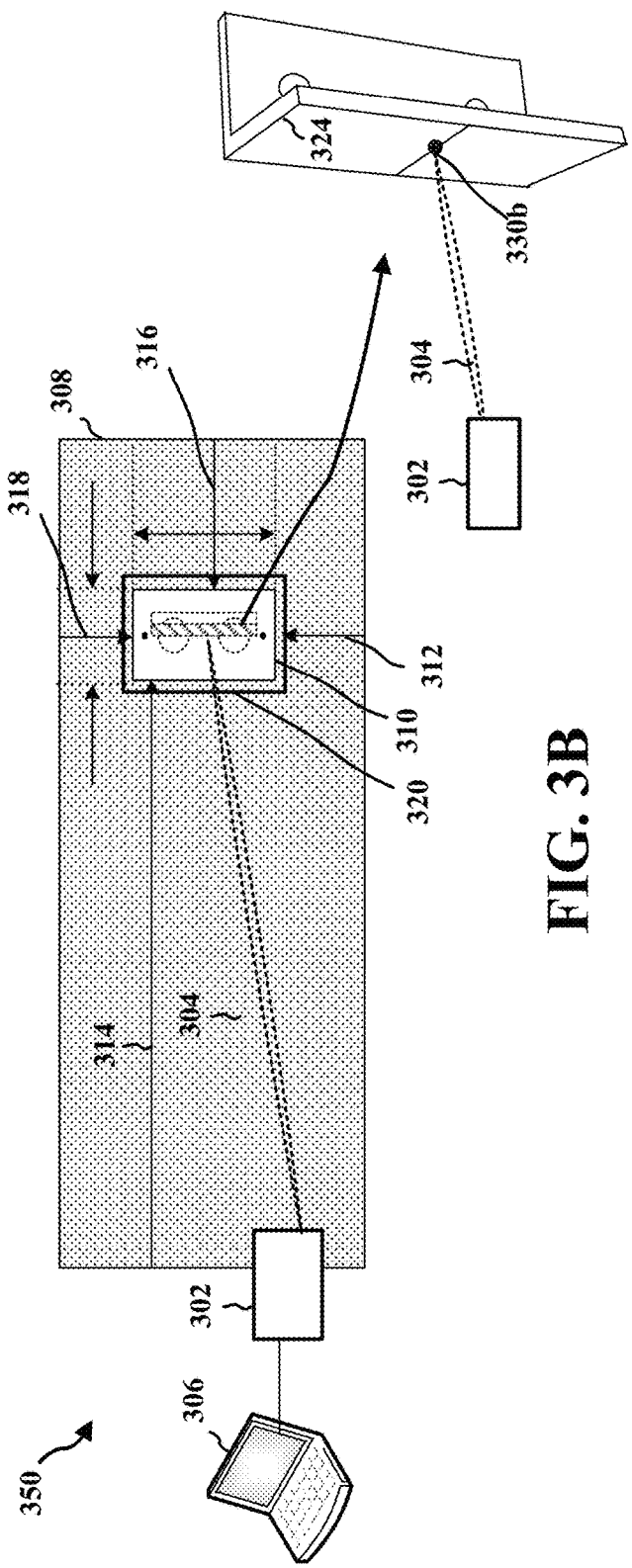
FIG. 3A
FIG. 3B

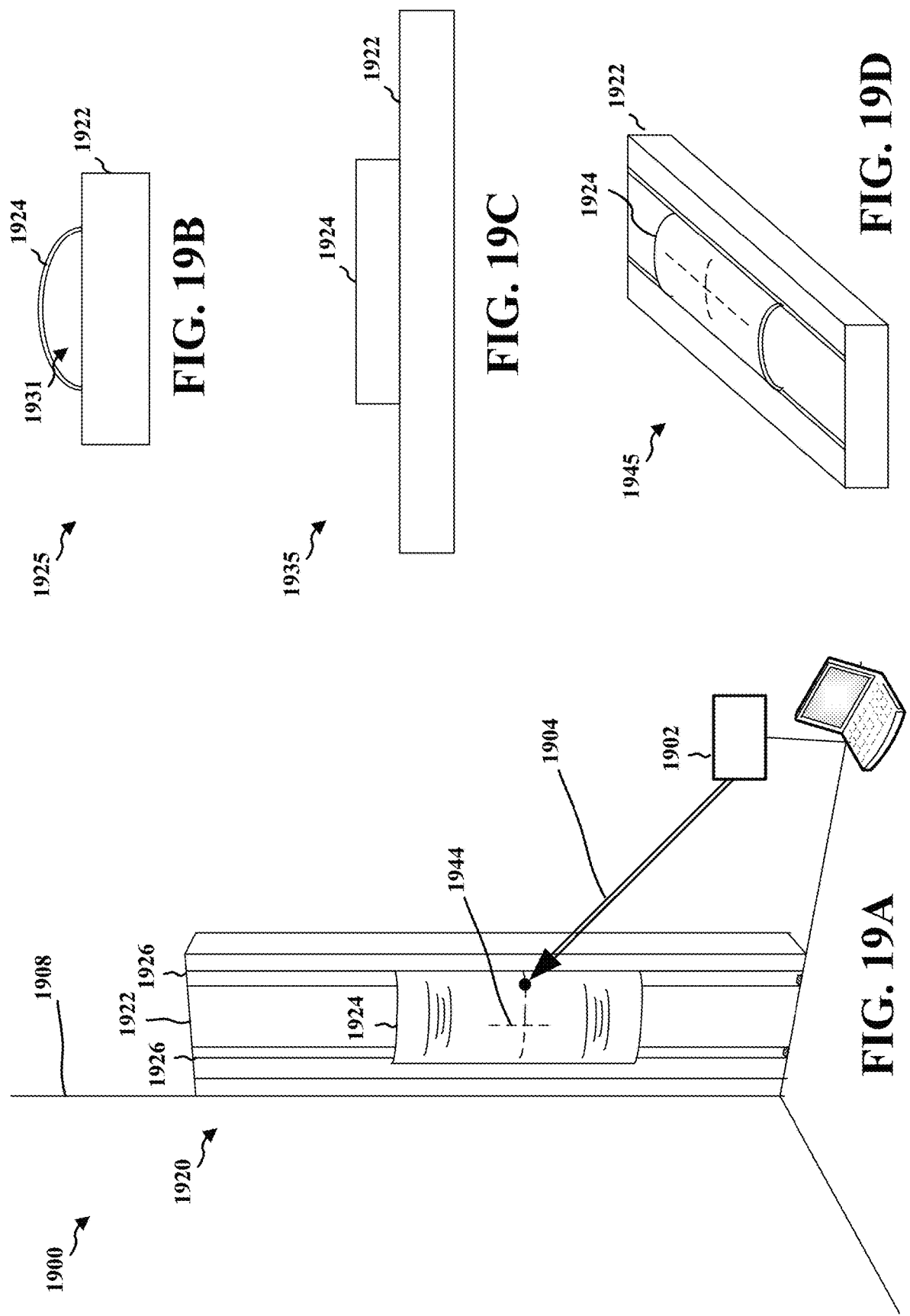

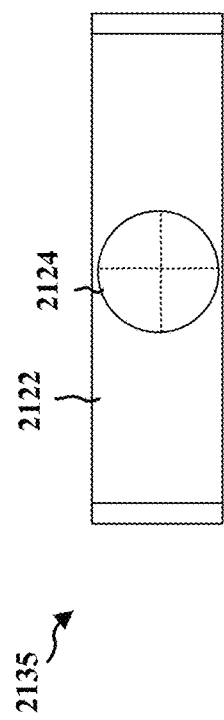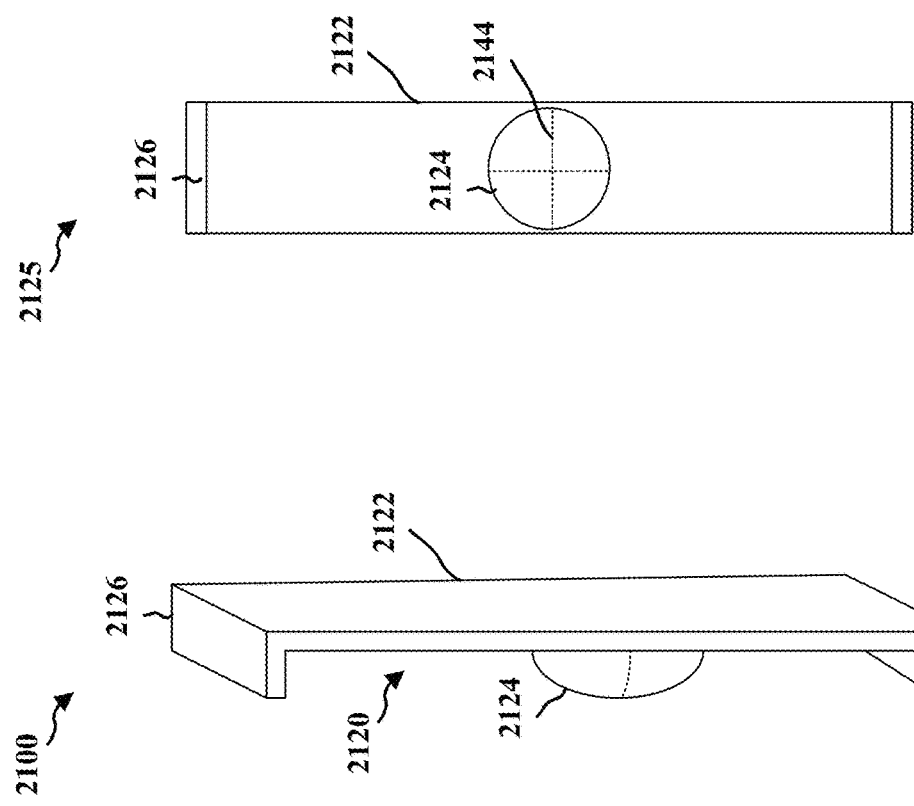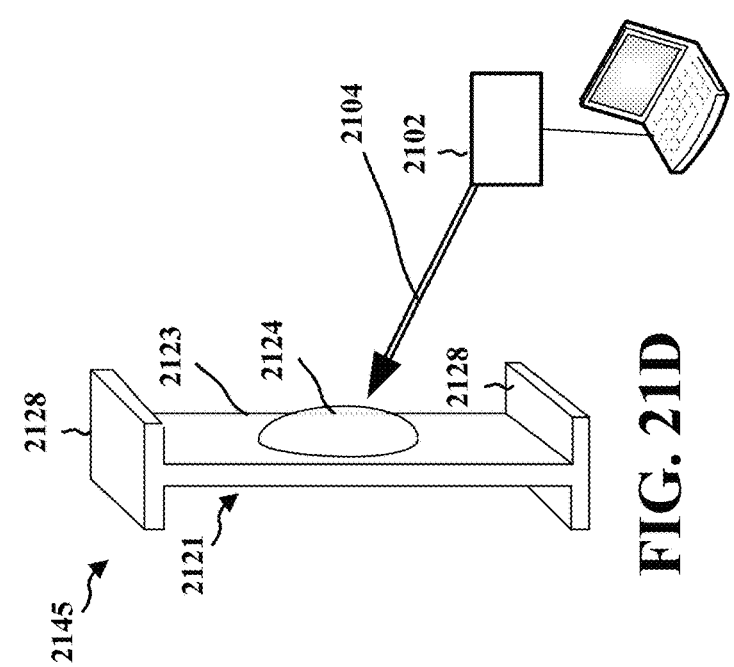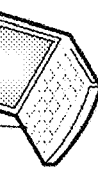
FIG. 21A
FIG. 21B
FIG. 21C
FIG. 21D

TEMPLATE MEASUREMENT APPARATUS

TECHNICAL FIELD

The present disclosure relates generally to a template method and measurement tool for measurements in connection with counter and backsplash template measurements.

INTRODUCTION

In order to manufacture and install products such as countertops, cabinetry, framework, and other structure, in buildings, a template may be created to dimension the product to fit an installation structure. For example, a countertop or backsplash in a kitchen, bath, or other room of a dwelling may be sized based at least in part on the cabinet, pedestal, or structure with which the countertop is to be installed. In some examples, there may be additional details present, which are to be considered in the dimension of the counter. As an example, openings may be provided in the counter or backsplash for an electrical outlet, an electrical switch, or other similar feature. In some aspects, countertops may be placed adjacent to walls, which may be slightly irregular. The template measurements may enable a counter, backsplash, or other product to be dimensioned according to the position in which they are intended to be placed. In connection with a construction project, a technician may take measurements to create a template. The template may be manually created or may be created with one or more digital measurement tools. In some aspects, a virtual template may be created and stored.

In a manual example, the user may manually perform measurements and physically write down, or otherwise record, the measurements. The written measurements may then be used to create a template or may be used directed to cut pieces for installation. Manual measurement and template generation for a countertop can take a significant amount of user time and may provide a less accurate estimate of the countertop or backsplash configuration. Additionally, manually transferring measurements to an automated manufacturing system allows the potential for an entry error by the user.

In some aspects, electronic tools, such as a digital measurement tool may be used in connection with creating the template. The digital measurement tool may be used to perform the measurement. In some aspects, the user may make manual notations of the measurements, or the digital measurements may be automatically stored in a digital application. The digital application may use measurements to create a digital template.

If a measurement is performed or recorded inaccurately, a return visit to a site may be required. Additionally, mistakes might not be recognized until the cut piece of product is transported to the installation site and an installation attempt is made. This can lead to added installation time and scheduling inefficiencies for installing technicians that are unable to install a product at the anticipated time. As well, a piece of stone or other product that is cut or formed based on an inaccurate measurement may be wasted and unable to be adjusted to the correct dimensions.

Thus, there exists a need for improvements in templating, such as for countertops, backsplashes, etc., to improve time efficient and increase accuracy. Aspects presented herein provide apparatus and methods for improved template measurements that provide improved accuracy and ease of measurement and to avoid wasted materials and other inefficiencies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method and an apparatus are provided for template measurements. In some aspects, a template measurement tool for template measurements for a counter or backsplash template is provided, the template measurement tool comprising: a planar base piece; and an extension configured to extend from the planar base piece and in a direction perpendicular to the planar base piece to provide a measurement surface for a measurement in connection with the counter or the backsplash template.

In some aspects, the planar base piece comprises at least one alignment feature to align with an outlet box opening of an outlet box to be measured for the counter or the backsplash template, wherein the planar base piece is configured to present the extension at a center position relative to the outlet box when the at least one alignment feature is aligned with the outlet box opening.

In some aspects, the extension comprises a planar surface extending perpendicular from the planar base piece. In other aspects, the extension comprises a rounded surface comprising a partial cylindrical shape or partial spherical shape.

In some aspects, a method of use of a template measurement tool is provided, the method comprising: positioning the template measurement tool at an outlet box or against a flat surface to be measured, the template measurement tool comprising: a planar base piece; and an extension configured to extend from the planar base piece and in a direction perpendicular to the planar base piece to provide a measurement surface for a measurement in connection with a counter or a backsplash template; using a measurement tool to perform a template measurement from a measurement point to the extension of the template measurement tool; and generating a template for the counter or the backsplash using the template measurement.

In some aspects, a template measurement kit is provided, the kit comprising: a first template measurement tool comprising: a first planar base piece and a planar extension configured to extend from the first planar base piece and in a direction perpendicular to the first planar base piece to provide a first measurement surface for a first measurement in connection with a counter or a backsplash template; and a second template measurement tool comprising: a second planar base piece and a rounded extension extending from the second planar base piece to provide a second measurement surface for a second measurement in connection with the counter or the backsplash template To the accomplishment of the foregoing and related ends, the one or more aspects comprise the features hereinafter fully described and particularly pointed out in the claims. The following description and the drawings set forth in detail certain illustrative features of the one or more aspects.

These features are indicative, however, of but a few of the various ways in which the principles of various aspects may be employed.

BRIEF DESCRIPTION OF THE DRAWINGS

FIG. 3A and FIG. 3B are diagrams showing measurement of an outlet opening with and without a template measurement tool, in accordance with aspects of the present disclosure.

FIG. 19A, FIG. 19B, FIG. 19C, and FIG. 19D illustrate various example aspects of a template measurement tool having a rounded extension, in accordance with aspects of the present disclosure.

FIG. 21A, FIG. 21B, FIG. 21C, and FIG. 21D illustrate various example aspects of a template measurement tool having a partial spherical extension, in accordance with aspects of the present disclosure.

DETAILED DESCRIPTION

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements.

Figure 1:
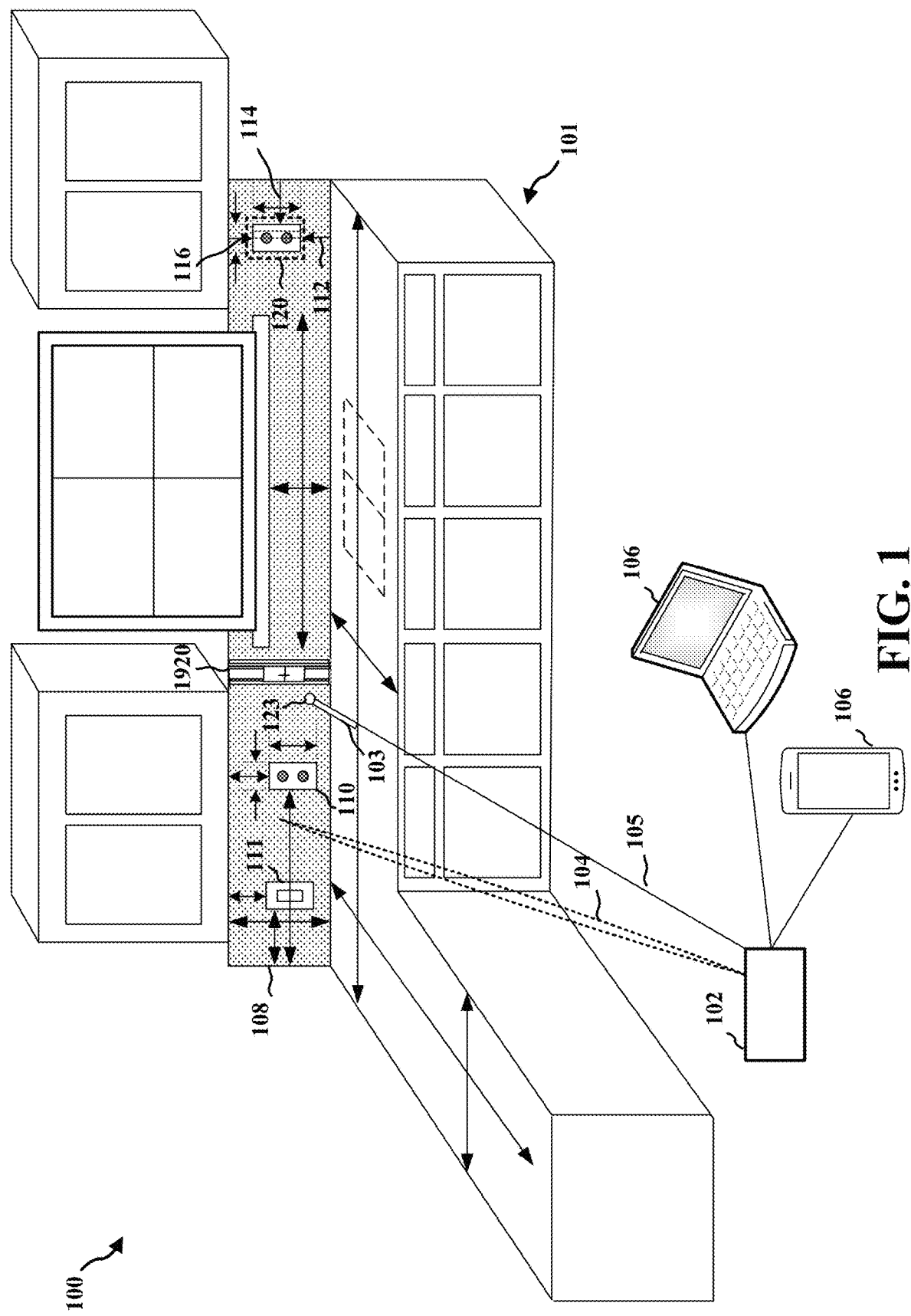
FIG. 1 illustrates an example diagram showing dimension measurements that may be taken in connection with the production and installation of building features such as a countertop and/or backsplash, in accordance with aspects of the present disclosure.

FIG. 1 illustrates an example diagram 100 showing dimension measurements that may be taken in connection with the production and installation of building features such as a countertop and/or backsplash. The countertop may be cut or formed to dimensions for placement on top of cabinetry or another type of pedestal or support. A backsplash 108 may comprise one or more additional piece of material that are cut or formed for placement against a wall or other support. The backsplash 108 may be cut or formed to be placed/secured above and adjacent to the upper surface of the countertop. As discussed herein, measurements of the dimensions for the countertop and/or backsplash may be performed manually or with one or more digital tools.

FIG. 1 illustrates an example in which a digital measurement tool 102 may emit a beam 104 or signal, such as a beam of light, to perform digital measurements of the intended installation site. Once a template is created, the stone may be cut and formed with manual and/or computer controlled equipment. A cutting machine may be controlled digitally. A machine generated 2D profile may be created from the template, and may be exported into an associated CAD system for controlling machinery to cut the pieces of stone.

For example, the measurement tool may emit a laser beam that the device uses to perform the measurements. The measurements may be controlled and/or stored by a computer device 106. Although a laptop and tablet or smartphone are illustrated as examples of a computer device, various computer devices that comprise memory and at least one processor may be used for the computer device 106. The computer device 106 may be integral with, or comprised within, the measurement tool 102, or may comprise a device such as a personal computer, a tablet, a smart phone, a personal digital assistant (PDA), or other device that is separate from the measurement tool 102, and that communicates with the measurement tool 102 either in a wireless manner or via a connection or wire.

In some aspects, the digital measurement tool may be used to efficiently and accurately perform measurements and record dimensions for producing a custom countertop or backsplash that is dimensioned according to structure with which the countertop or backsplash will be installed. For example, the measurements may be used to cut a piece of stone, or other material, for the counter and/or backsplash. The measurements may be entered into a computer automated design (CAD) system, which may be used to prepare for and/or cut the piece of stone. The measurements may be taken and stored manually. The measurements may be taken digitally and may be provided directly to the CAD system or to an automated cutting tool. In some aspects, digital measurements may help to avoid inaccurate measurements or transposed digits that may be handwritten by a user. In some aspects, a display may provide a visual representation of the measurements, e.g., such as a display at the computing device 106. The visual representation may enable a user to quickly and visually verify the general accuracy of the measurements, while at the installation site, by comparing the computer representation to the area being measured. Use of a beam of light may enable measurements in difficult or hard to reach locations.

In other aspects, a digital measurement may be performed using a probe 103 rather than an emitted signal or laser beam, such as shown at 104. In some aspects, a retractable line or wire 105 may be attached to the probe 105. In other aspects, the probe may be without a connecting line and may send a wireless signal to the measurement tool 102. The user may perform various measurements relative to the measurement tool 102 through use of the probe 103. The probe may include a measuring head 123, which may be rounded, pointed, or have another shape. The user may mark, or touch the probe, to the relevant points along the wall, cabinets, etc., which the measurement tool 102 and/or computing device 106 records. The measurement tool may translate or combine the measurements to form a template, or may transfer the measurements to a CAD file or a cutting device. In some aspects, a probe may measure straight, curved, or complex shapes, and may measure in a horizontal direction, a vertical direction, or a slanting direction.

FIG. 1 illustrates that, in addition to length and width measurements, measurements may be taken for features such as outlets 110, electrical switches 111, windows, etc. For example, a piece of stone for a backsplash 108 may have an opening cut to a dimension for the outlet 110 and electrical switch 111. In addition to the dimension of an opening to be provided in a backsplash piece for an outlet 110, measurements, such as 112, 114, 116, and more may be taken in order to properly place the opening for the outlet within the backsplash 108.

FIG. 1 illustrates an example outline for a template measurement tool 120 as described herein that may be used to assist with manual and/or digital template measurements. The tool makes measurements, whether manual or digital, easier to perform with greater accuracy. The improved accuracy reduces the chance that a piece of stone, or other material, will be inaccurately cut and lead to installation inefficiencies.

Figure 2B:
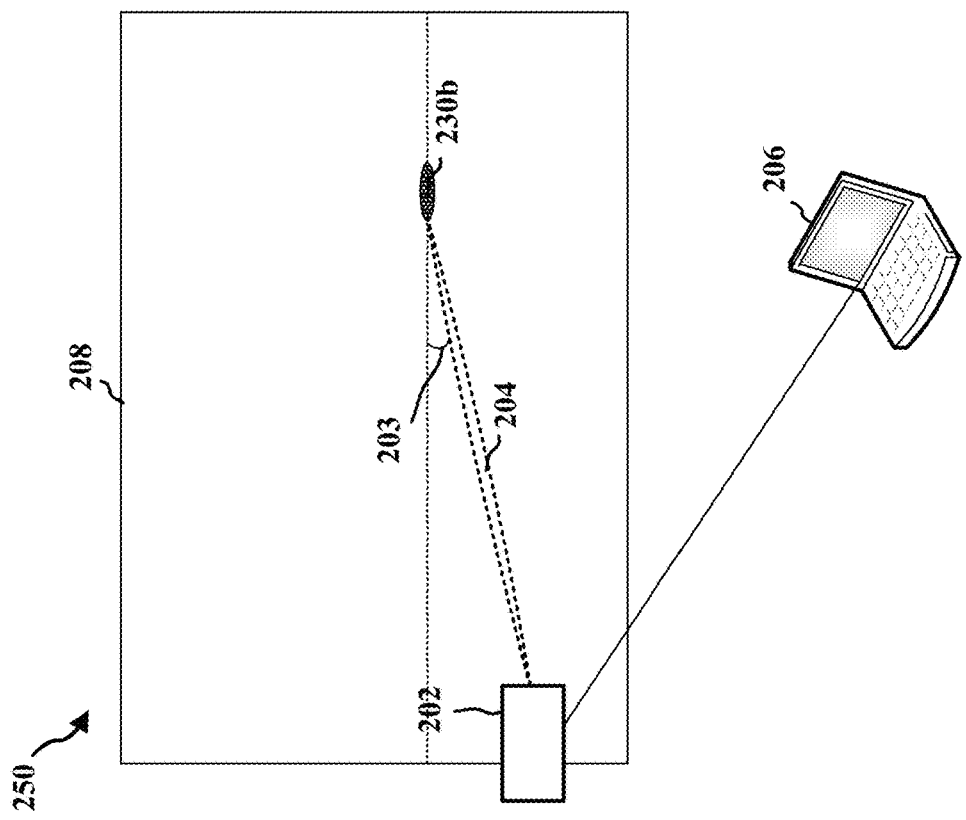
FIGS. 2A and 2B are diagrams illustrating a digital measurement in which a light beam is emitted from a measurement tool, in accordance with aspects of the present disclosure.
Figure 2A:
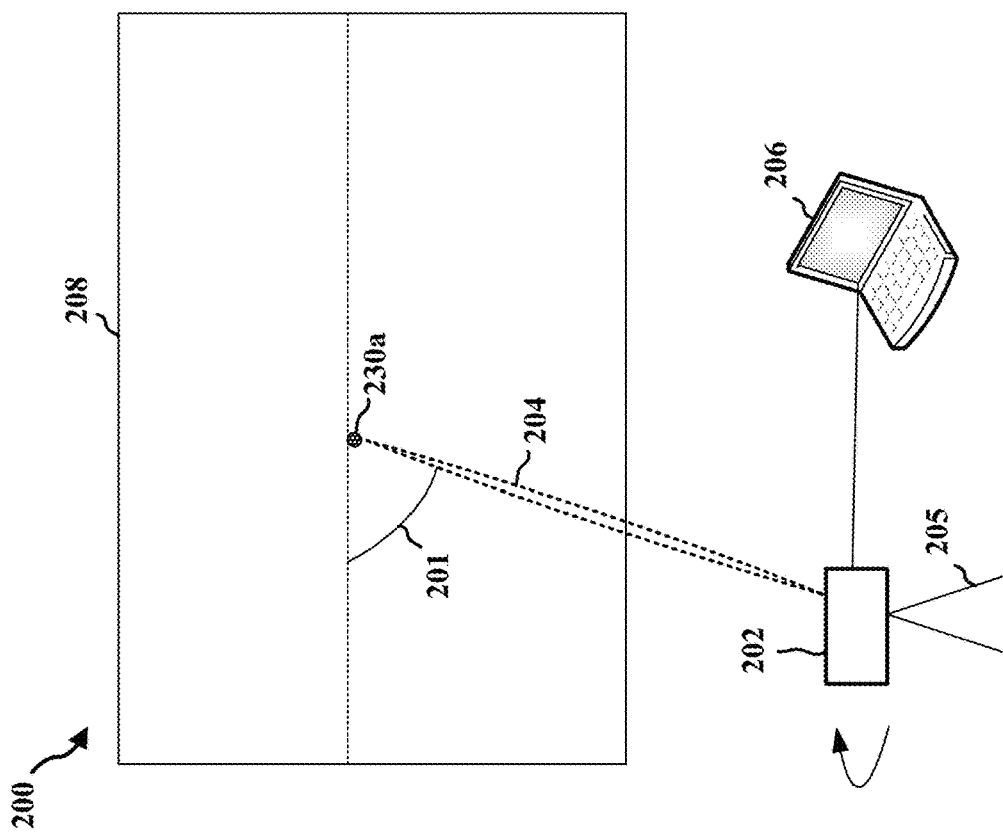

FIG. 2A is a diagram 200 illustrating a digital measurement in which a light beam 204 is emitted from a measurement tool 202 having a corresponding computing device 206, such as described in connection with 102 and 106 in FIG. 1. In FIG. 2A, the light beam 204 is directed almost perpendicular to the wall 208, as shown by the angle 201, and forms an illuminated point 230*a* that is close to the size of the beam 204. In contrast, in the diagram 250 in FIG. 2B, the angle 203 is smaller so that illuminated point 230*b* is stretched, and wider than the illuminated point 230*a* in FIG. 2A. The distortion of the beam at the illuminated point 230*b* in FIG. 2B can lead to an inaccurate measurement.

In some aspects, the measurement tool, e.g., 102 in FIG. 1 or 202 in FIG. 2B, may be positioned on a stand 205 and may swivel, move, or rotate to take different measurements within the room. Therefore, some of the measurements may have the beam 204 close to perpendicular to the object or wall being measured, whereas for other measurements, there may be a smaller angle, such as shown in FIG. 2B.

If an inaccurate measurement is for an outlet placement, the actual outlet 310 may be offset from the outlet cut into the backsplash piece 308. FIG. 3A includes a diagram 300 with an example similar to FIG. 2B, in which the measurement tool 302 and computing device 306 emit a light beam 304 from an angle that provides an extended, or distorted, illumination point 330*a*. If the measurement is intended to measure the dimension 314, and is intended to capture the distance to a leading edge of the outlet 315, the captured measurement may be closer to 317 based on the angle at which the measurement is taken.

Aspects presented herein provide tools that can be used to improve the accuracy of such measurements.

FIG. 3B is a diagram showing a template measurement tool 320 (which may be referred to herein as an outlet measurement tool or outlet templating tool) that can be placed at the position of the outlet 310 to assist in the accurate collection of measurements (e.g., 312, 314, 316, and/or 318) for the placement of the opening for the outlet 110 in a backsplash 308 or counter piece. The template measurement tool 320 includes an extension piece 324 that provides a surface for the beam 304 to strike, which enables an illuminated point 330*b* that is closer to the size of the beam 304. For example, the extension allows for the beam to strike the extension at an angle closer to perpendicular, such as illustrated in the example in FIG. 2A, rather than the smaller angle illustrated in FIGS. 2A and 3A. The smaller illumination point, or strike point, for the beam 304 leads to greater accuracy in the location or identification of the point being measured. The reference point enables the location of the outlet opening to be placed and dimensioned more accurately in a template that is then used to prepare or cut the backsplash 308, and helps to avoid wasted material due to an outlet opening or electrical switch opening that is cut in an incorrect position. Although the example in FIG. 3B illustrates the extension as having an L-shape, in other aspects, the extension may have a different configuration, while continuing to provide an extension that can be placed at an outlet position and extends perpendicular to the outlet opening to provide a surface to intersect the beam 304.

Figure 4:
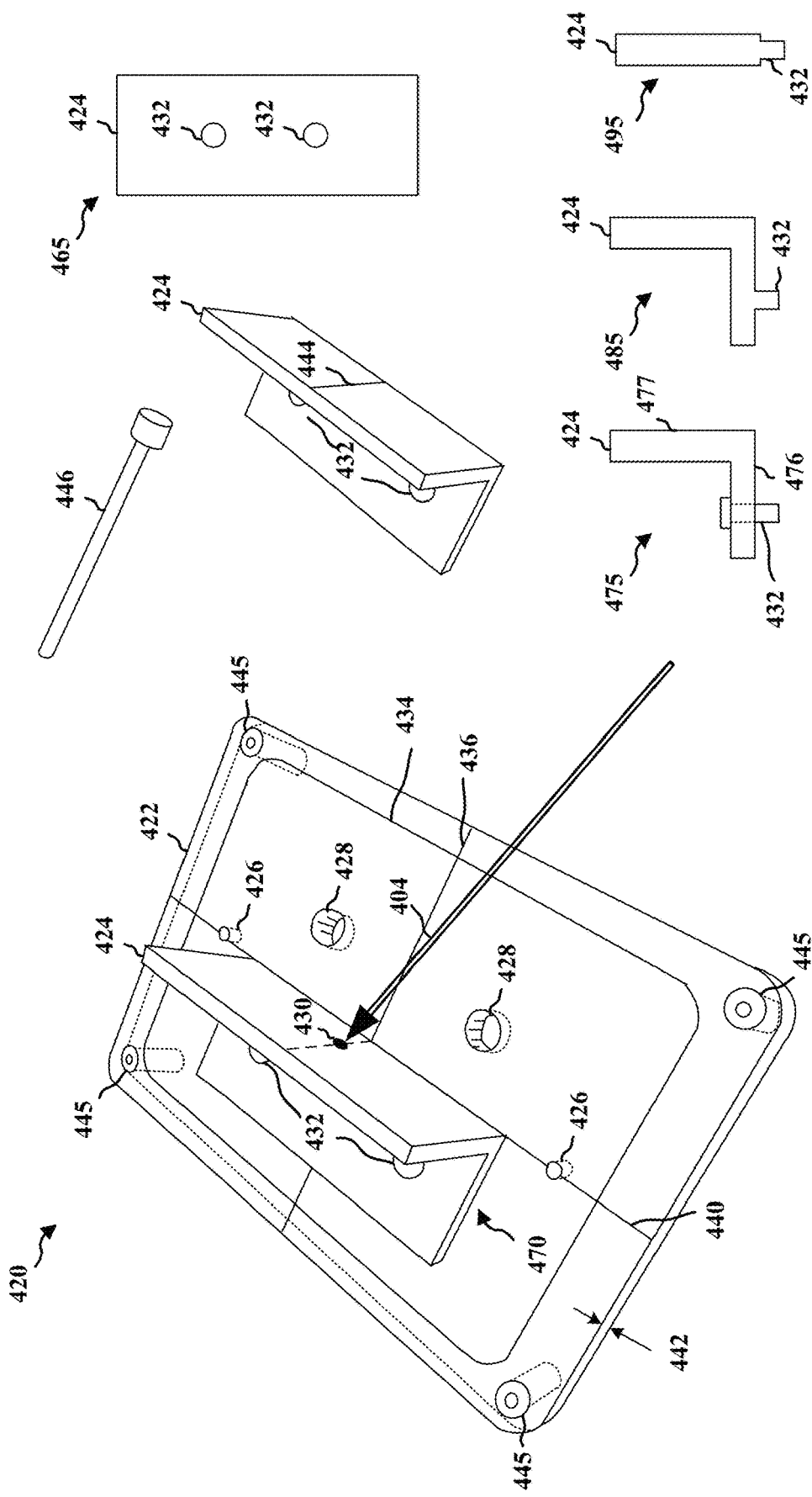
FIG. 4 is a diagram showing an example template measurement tool, in accordance with aspects of the present disclosure.
Figure 8:
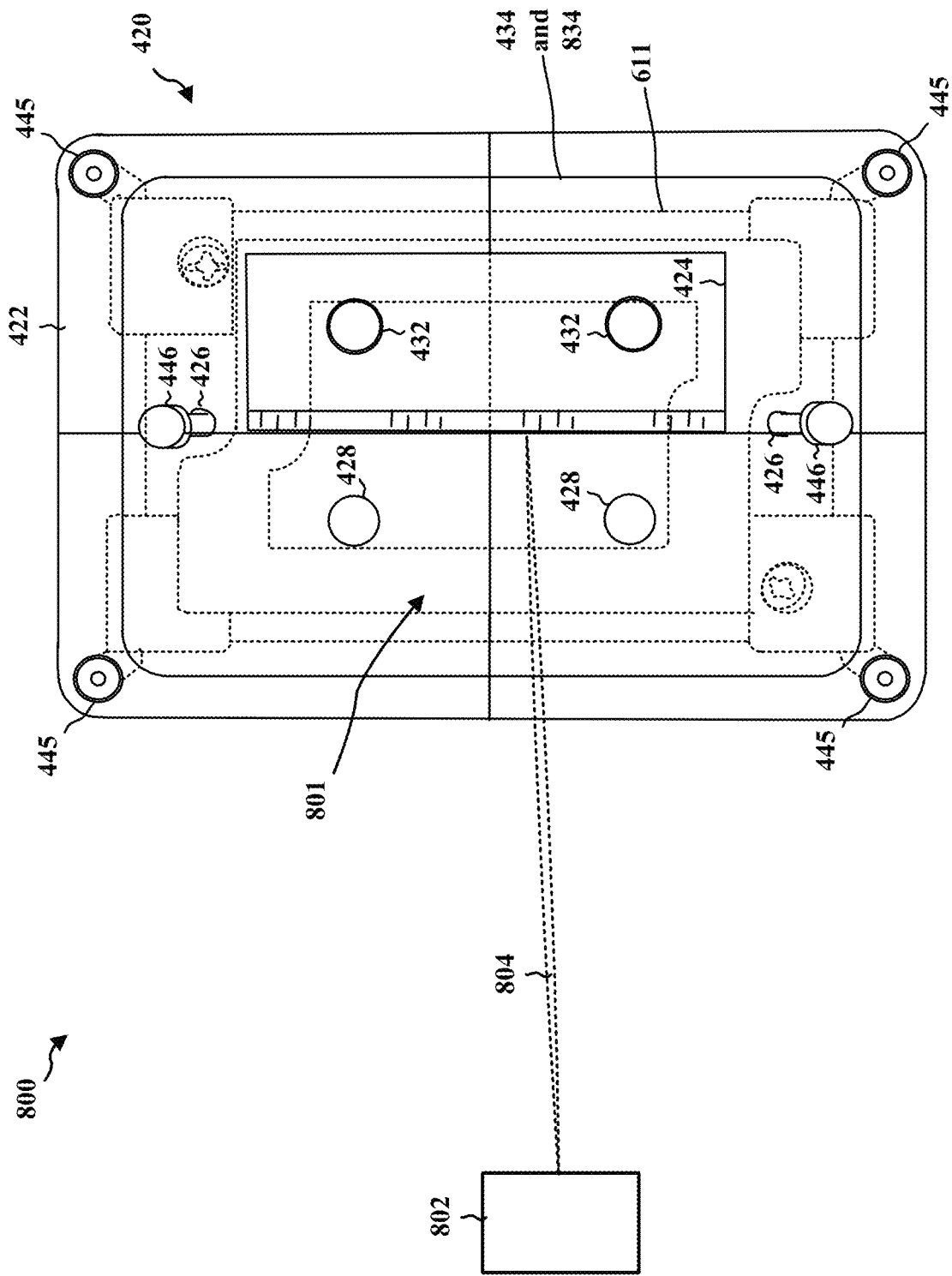
FIG. 8 illustrates a front view of a template measurement tool applied to an outlet box, in accordance with aspects of the present disclosure.

FIG. 4 is a diagram showing an example template measurement tool 420, e.g., which may correspond to the template measurement tool 320 and/or 120. The template measurement tool 420 is shown as having a base piece 422 that is configured to be placed, or positioned, at the outlet position. The base piece 422 may be referred to as a planar base piece, which can have a rectangular size that is larger than a perimeter of an outlet box opening. The perimeter of the planar base piece may represent or correspond to a typical cover plate size for the outlet box, for example. The base piece 422 may include visual indicators or markings that assist the user in the accurate placement of the template measurement tool relative to the outlet opening. For example, FIG. 4 shows the base piece 422 including a line 434 or visual indicator that is in the shape of a perimeter of an outlet box. An outlet box may refer to a box/location for an electrical outlet or an electrical switch. When properly placed, the line 434 aligns with the perimeter of the opening of the outlet box 801, as shown in FIG. 8. FIG. 4 also shows intersection lines 440 and 436 that visually illustrate a middle or central intersection of the length and width of the outlet box and the template measurement tool 420. The extension 424 may also have a visual indicator, such as a line, a circle, an arrow, or another visual indicator that indicates the middle of the extension 424, and therefore of the outlet opening, or to indicate a reference point 430 for measurement. The reference point may be provided or comprised on a measurement surface of the extension. In some aspects, a reference point, e.g., 430 may be shown visually or may be formed as a dent or indentation in the surface of the extension at the point that is intended to be measured. As an example, an indent may be used not only with a light beam, e.g., as shown at 404, but also with a probe 103, as shown in FIG. 1. For example, an indentation at the reference point 430 may be rounded to correspond to a rounded probe head. This may allow the probe to fit within the indent for a more accurate probe placement when performing a measurement. The base piece 422 may be sized to extend beyond the length and width of the outlet box, which may allow for spacers 445 to be positioned against the wall beyond the outlet box. For example, the spacers may be positioned at the base piece 422 outside of an outlet box opening, and may be configured to maintain a spacing of the base piece parallel relative to the surface of the wall. For example, the spacers help to align the target by helping the base piece to remain flat and perpendicular to a wall, e.g., even if the outlet box is not flat to the wall. In other aspects, the base piece 422 may be sized with an outer perimeter shaped to correspond to the opening of the outlet box. In such an example, the base piece 422 may be aligned with the outlet by lining up the perimeter of the base piece 422 with the perimeter of the outlet box opening.

Figure 16C:
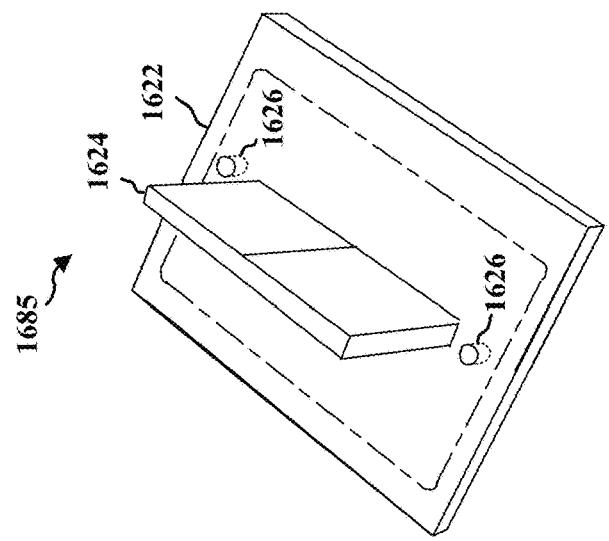
FIG. 16A, FIG. 16B, and FIG. 16C illustrate example aspects of template measurement tools, in accordance with aspects of the present disclosure.
Figure 16B:
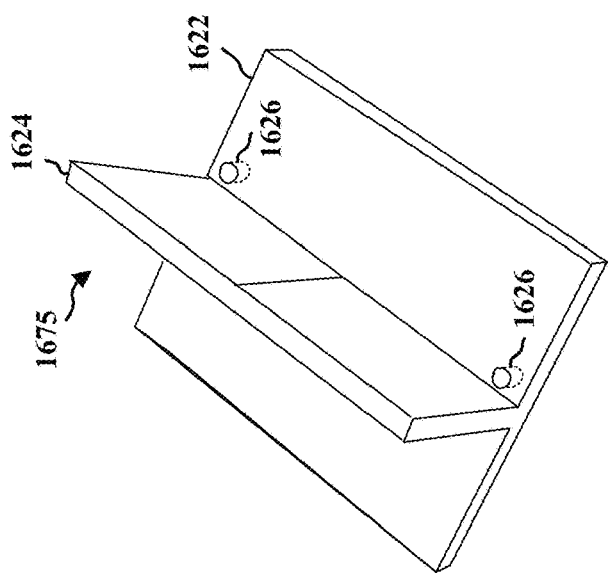

FIG. 4 illustrates that the extension 424, which provides the surface target/reference point 430/measurement surface, may comprise a removable piece that is inserted into, coupled to, removably connected to, or otherwise positioned together with the base piece 422. In other aspects, the base piece 422 and an extension 424 may be formed as an integral unit, e.g., formed from a single piece of material, or may include two pieces that are fixed or permanently coupled. In some aspects, the template measurement tool 420 may include a single unitary piece that forms the extension, such as shown in example 495. FIG. 16B illustrates additional examples in which the base piece may be formed as an integral unit with the extension.

In some aspects, the base piece 422 may include a different material than the extension 424. As an example, the base piece 422 may include a transparent material that enables the use to view the outlet box when placing the measurement tool. The transparent material enables the user to view the perimeter of the outlet box opening in order to align the reference line 436 with the outlet box opening in order to correctly position the outlet measurement tool 420 for an accurate template measurement. As an example, the base piece 422 may be formed of a plastic material, such as an acrylic, acrylic sheeting, plexiglass, or other transparent plastic, having a thickness shown at 442.

The extension 424 may include an opaque material that provides an illumination point for the beam from the measurement tool. As an example, the extension may comprise a metal material or opaque or matte plastic material. In some aspects, the base piece 422 and the extension 424 may be formed of the same material. As an example, the base piece and the extension may both be formed of a plastic material. In other examples, the base piece and the extension may be formed of, or cut from, a metal material.

Figure 9:
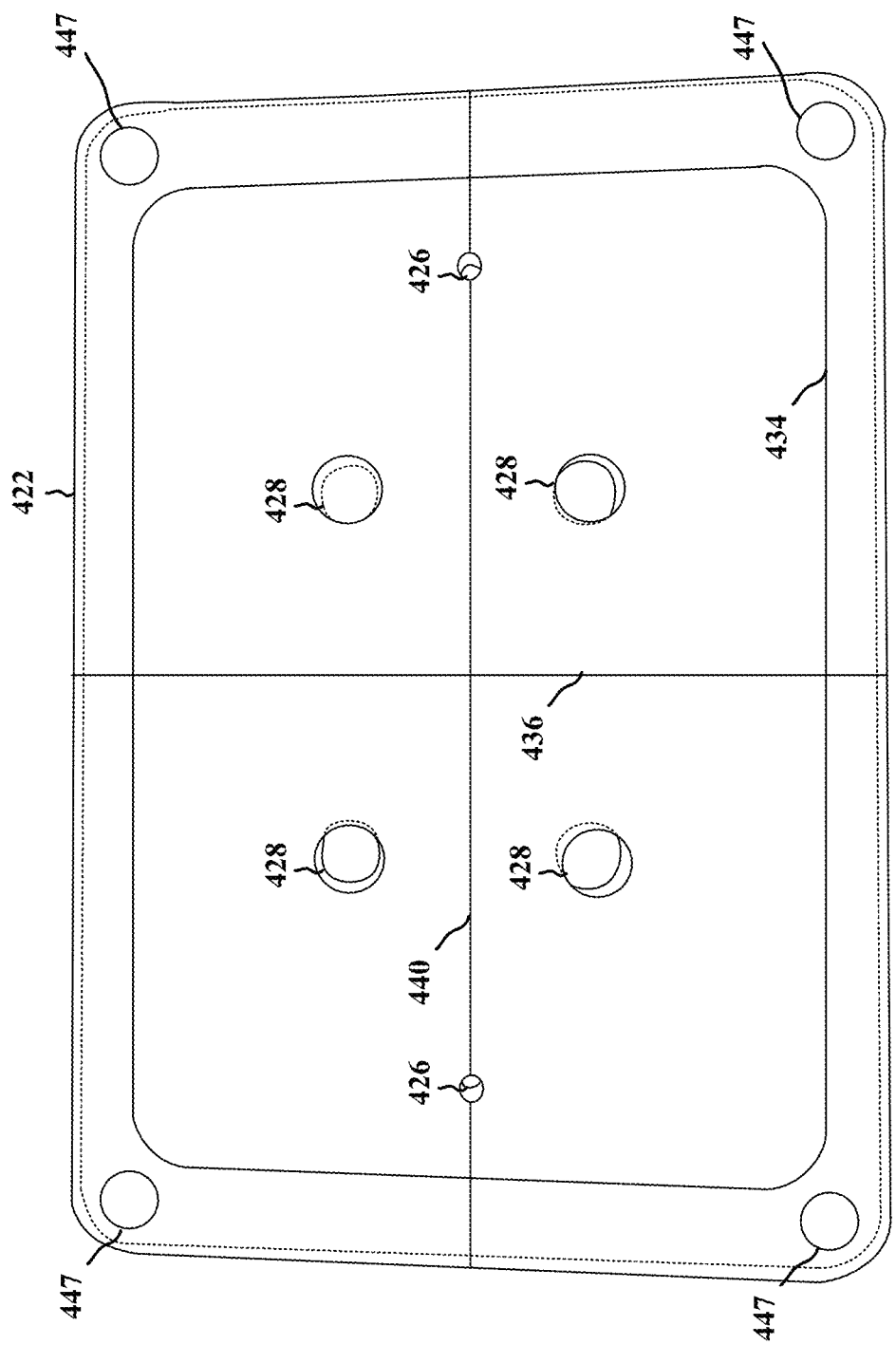
FIG. 9 is a diagram showing a front view of a base piece separate from an extension piece, e.g., without the extension inserted, in accordance with aspects of the present disclosure.

FIG. 4 illustrates that the base piece 422 may include one or more sets of openings 428 that are configured to receive insertion components 432 (which may also be referred to as extensions, pegs, etc.) that extend from the extension 424. FIG. 9 illustrates a view of the base piece 422 without the extension 424 inserted, and shows the sets of openings 428. View 465 shows a bottom view of the extension 424. View 467 illustrates an oblique view of the extension 424. Example 475 in FIG. 4 illustrates an end view (e.g., from end 460) of the extension 424 showing that the insertion components 432 may be an additional component that is inserted through a portion of the extension 424. Example 485 shows a similar end view of an extension 424 in which the insertion components 432 may be integrally formed with the extension 424. The Examples 475 and 485 in FIG. 4 show examples of the extension 424 having an angled shape or "L" shape in which a first portion 476 is configured to be positioned adjacent and parallel to the surface of the base piece 422, and a second portion 477 of the example L-shaped extension piece is configured to extend away from the surface of the base piece 422 to provide the reference point 430/measurement surface. The example 495 shows an example in which the extension 424 may include a single piece that extends from the surface of the base piece 422, e.g., with the portion 476. The first portion 476 can provide added stability and strength for the extension 424.

Although two sets of two openings 428 are illustrated, the base piece 422 may include a single set of openings or more than two sets of openings. Additionally, each set of the openings may include one or more openings configured to receive one or more insertion components 432 of the extension 424. In some aspects, the use of multiple openings, e.g., two or more openings in each set, to receive a set of insertion components may help to ensure proper alignment of the extension and may prevent rotation/misalignment of the extension 242. In other aspects, the extension 424 may include a single insertion component 432, and the base piece 422 may include a single opening 428. In some aspects, if the insertion component has a cylindrical shape, or circular cross-section, the single insertion component 432 may enable the extension 424 to be rotated to different positions in order to adjust the angle of the portion 477 of the extension relative to a beam of light 404 or other measurement tool. In other aspects, the cross section may be square, hexagon, or another shape that reduces or prevents rotation after insertion.

FIG. 4 illustrates openings 426 in the base piece 422 that are configured to align with a similar sized opening in an outlet box. For example, the outlet box may include threaded opening configured to receive a screw that secures a faceplate to the outlet box. The openings 426 of the base piece 422 of the template measurement tool 420 can be manually lined up with the screw receiving openings of the outlet box in order to properly place the template measurement tool 420 for use in measurement. In some aspects, a pin, peg, screw or other securing mechanism may be inserted through the opening(s) 426 and into the opening in the outlet box that is configured to receive a screw. An example pin 446 is illustrated that can be inserted through the opening 426 and used to hold the template measurement tool 420 to the outlet box for measurement. Although a pin 446 is illustrated, a screw may similarly be used. In some aspects, a pin may enable quicker application and removal. In some aspects, the use of one or more screws may provide a more stable positioning of the tool. The one or more openings enable the template measurement tool 420 to be removably positioned with the base piece 422 at the position of the outlet. The openings 426 are positioned to line up with the openings in an outlet box, and a pin 446, screw, or other piece can be inserted into the opening 426 and the opening in the outlet box to hold the base piece 422 in the correct position.

Figure 5:
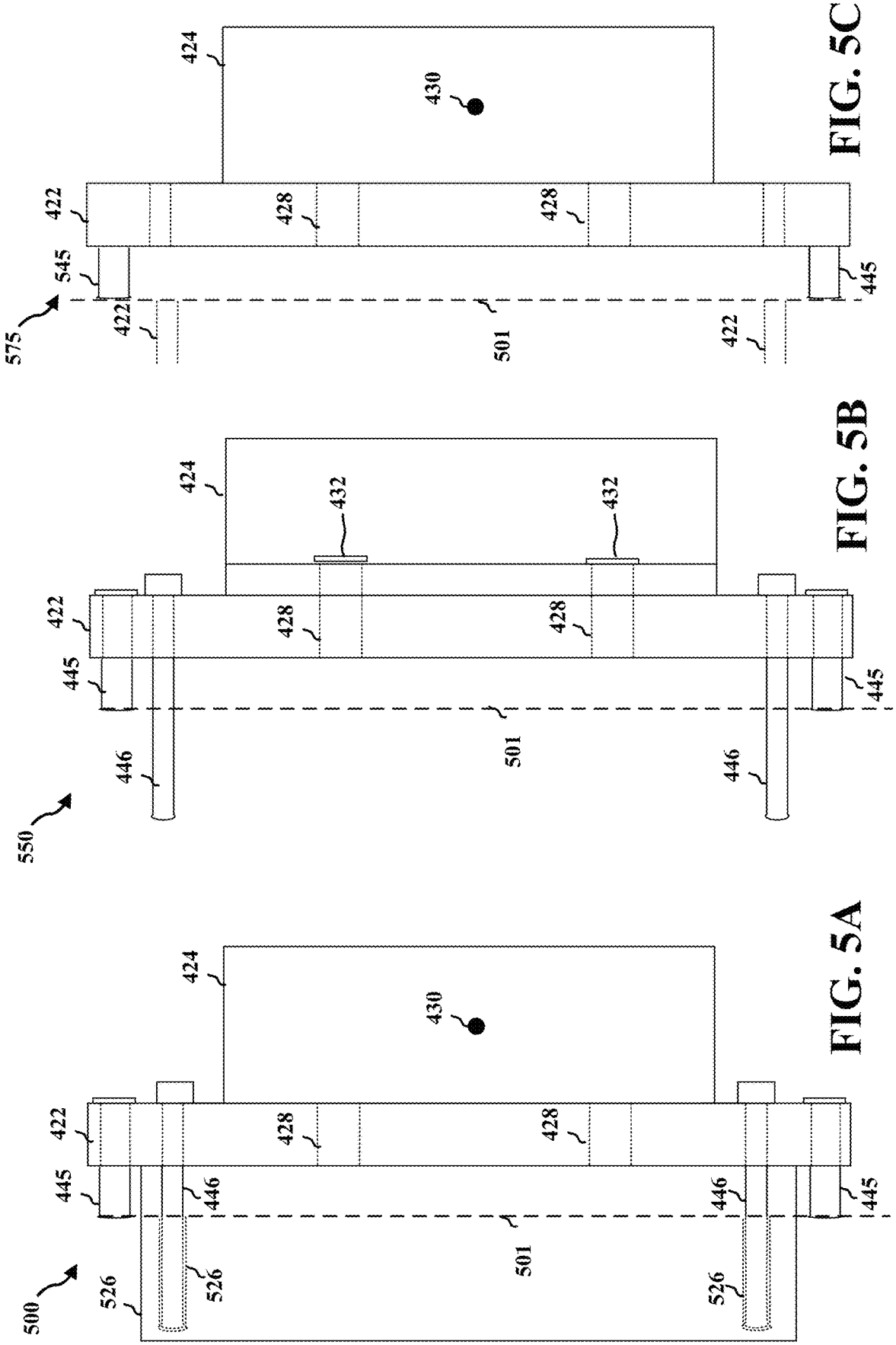
FIG. 5A, FIGS. 5B, and 5C illustrate side views of a template measurement tool, in accordance with aspects of the present disclosure.

FIG. 4 illustrates that the template measurement tool 420 may include spacers 445 that space the tool from the wall when positioned for measurements. In some aspects, the spacers may be removable, e.g., inserted into openings 447 of the base piece 422, e.g., as shown in the example base piece 422 shown in the view 900 in FIG. 9. In other examples, the spacers may be integrally formed with the base piece 422. FIG. 5C illustrates an example side view 575 of a template measurement tool 420 showing spacers 545 shown as integrally formed extensions of the base piece 422.

Figure 15:
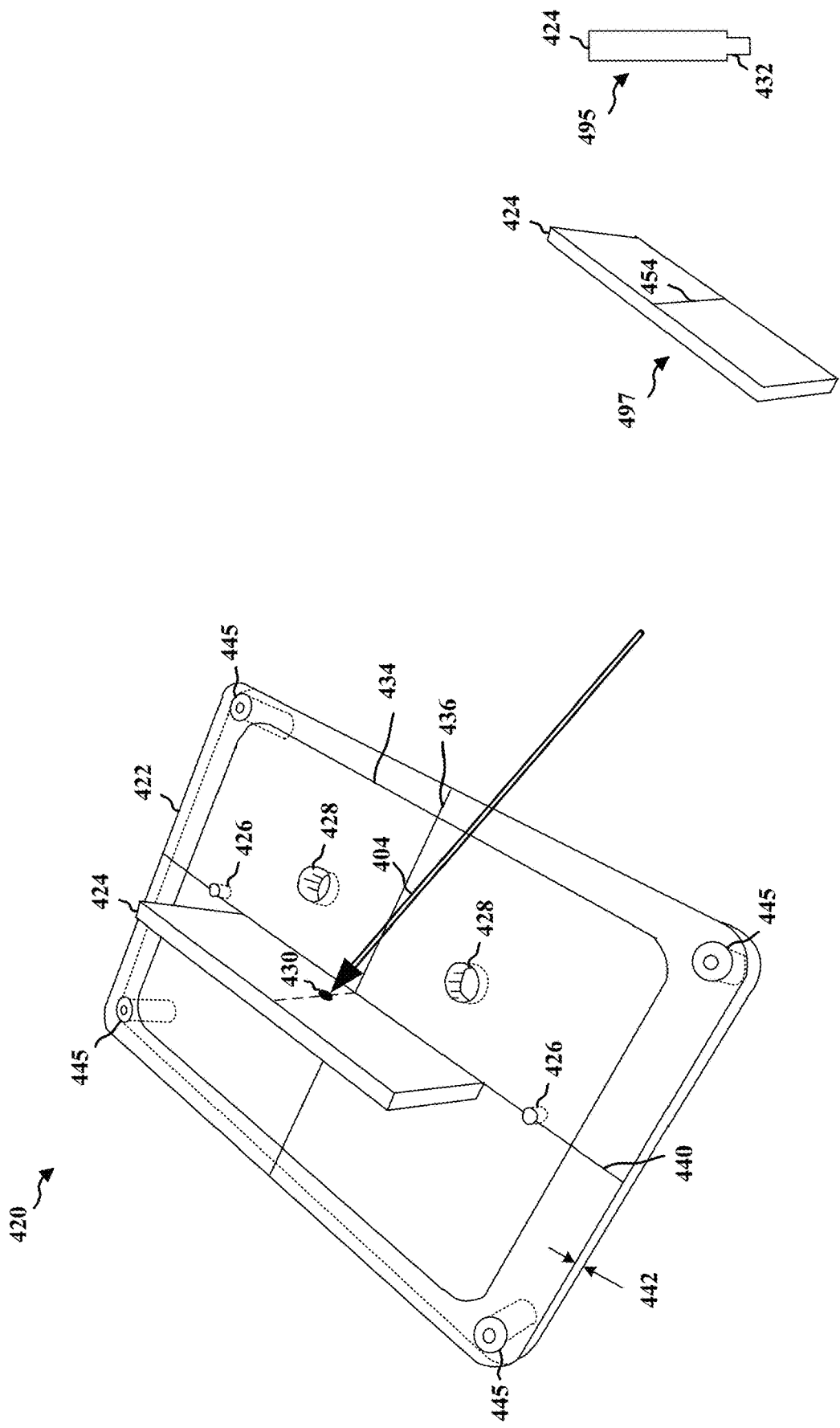
FIG. 15 illustrates an example template measurement tool, in accordance with aspects of the present disclosure.
Figure 17:
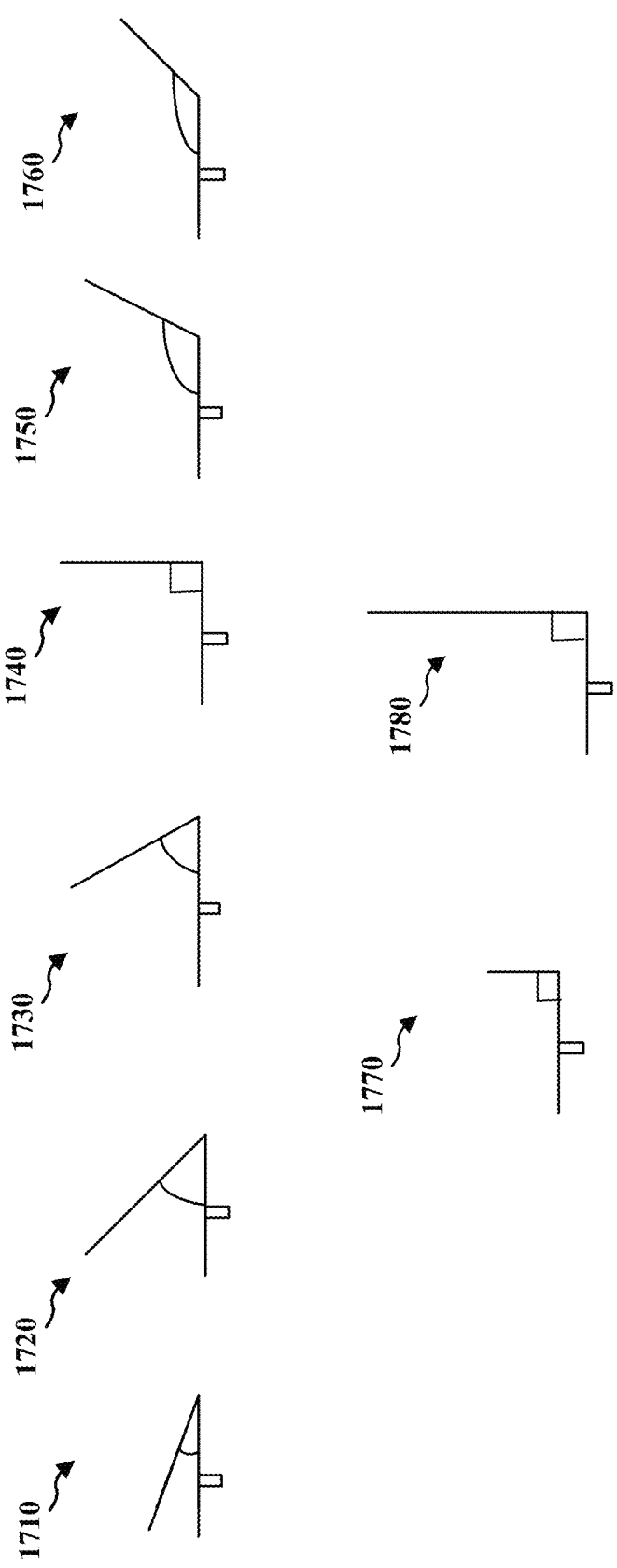
FIG. 17 illustrates an example variations of extensions, in accordance with aspects of the present disclosure.

As noted in connection with FIGS. 15, and 17, in some aspects, the extension may have a different shape than the L-shape shown in FIG. 4. A non-L shape is shown for the example 424. FIG. 15 illustrates an example of a base piece 422 having a non-L shape extension 424 inserted from the example 495, and shows additional views of the extension 424 from a side and a cross-section.

FIG. 9 is a diagram showing the view 900 of the base piece 422 without the extension 424 inserted, and shows that the base piece 422 may include multiple sets of openings 428 that allows the extension to be inserted at different positions. FIG. 5A and FIG. 5B illustrate side views of the template measurement tool 420 and show the extension 424 inserted in a different orientation or different set of openings 428. The extension may be positioned in a set of openings so that the portion 477 that extends away from the base piece 422 is substantially centered on the base piece, e.g., has an edge/surface along line 440. FIG. 5A illustrates a view in which the insertion components 432 are inserted in the further openings 428 so that a flat surface of the extension 424 (e.g., corresponding to the portion 477) is presented. In FIG. 5B, the insertion components 432 are inserted into the closer set of openings 428 in comparison to FIG. 5B and by FIG. 12A in comparison to FIG. 12B.

The side view in FIG. 5A, FIG. 5B, and FIG. 5C shows that the spacers 445 or 545 may be positioned between a wall 501 and the base piece 422 to maintain the template measurement tool at a desired distance from the wall for performing the measurement of the outlet placement. FIG. 5A also shows the pin 446, or screw, inserted through the openings 426 in the template measurement tool and also inserted though and openings 526 of an outlet box 503 (which is not drawn to scale). FIG. 5B and FIG. 5C do not illustrate the outlet box behind the wall 501.

Figure 6:
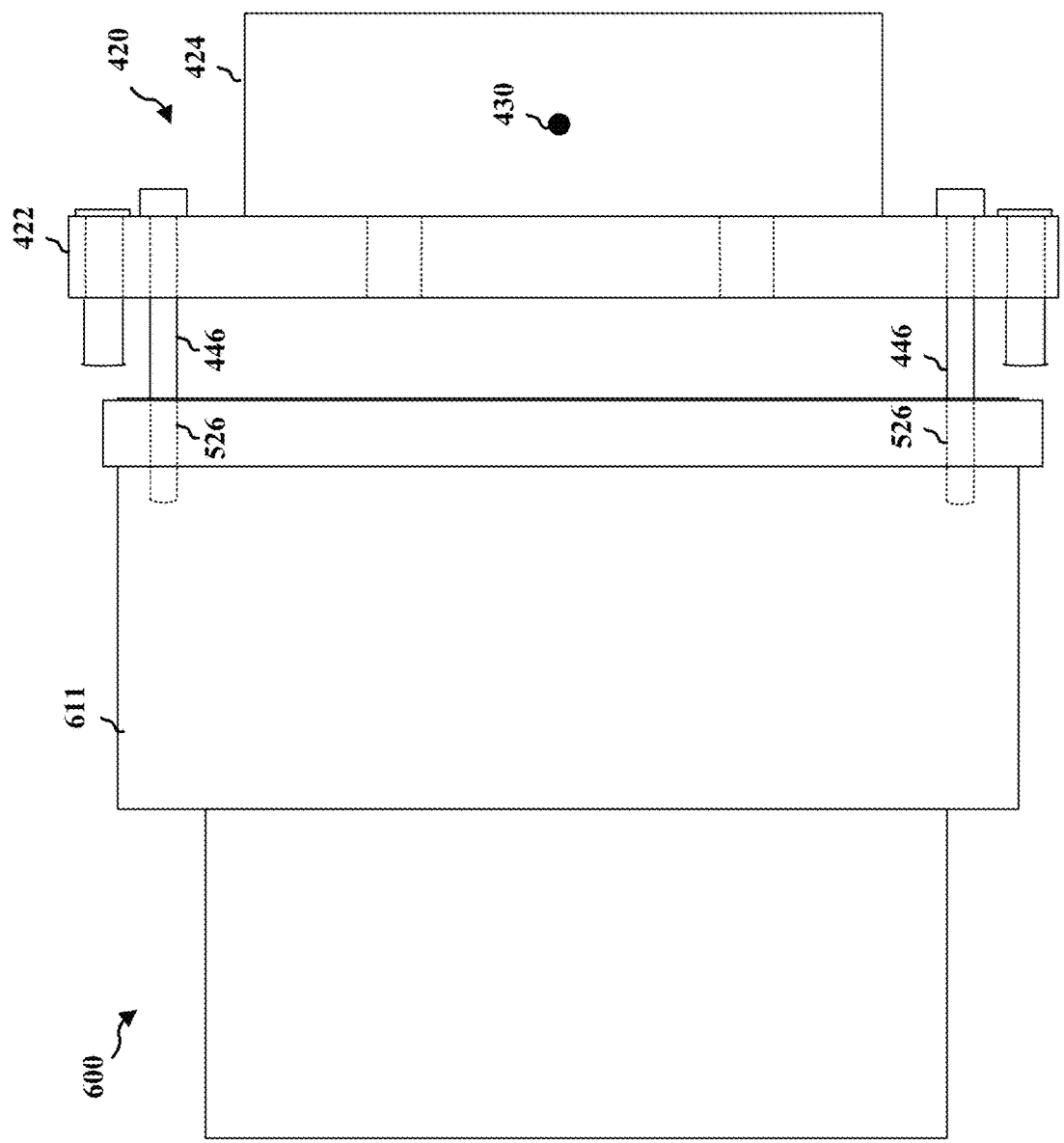
FIG. 6 illustrates a side view of a template measurement tool, in accordance with aspects of the present disclosure.
Figure 7:
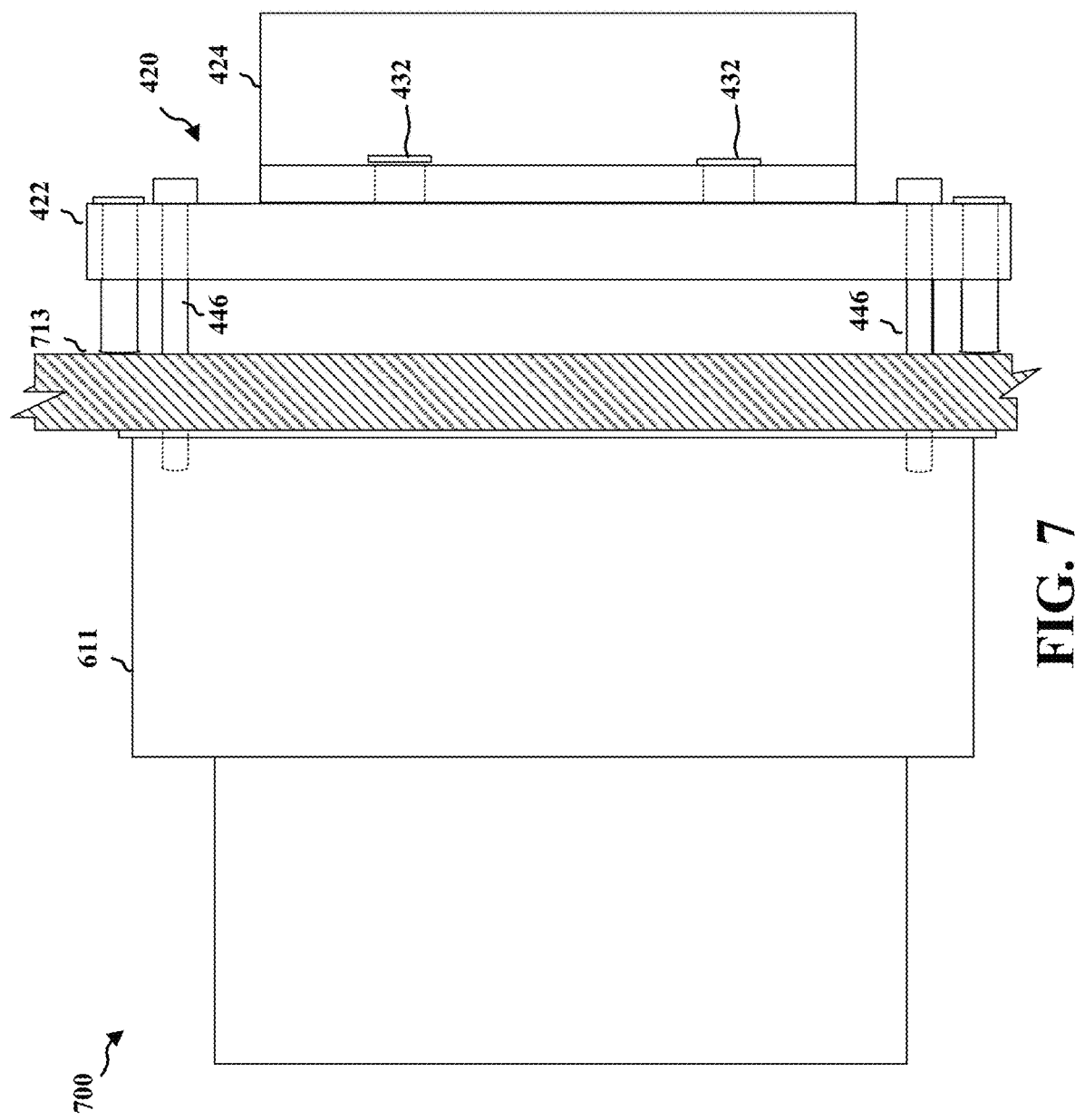
FIG. 7 illustrates a side view of a temperate measurement tool and the outlet box, in accordance with aspects of the present disclosure.

FIG. 6 illustrates a side view 600 of the template measurement tool 420 removably connected to, e.g., positioned at, an outlet box 611 by inserting the pins 446, or screw, into the opening 526 in the outlet box, e.g., the opening or hole that is threaded and configured to receive a screw that holds the faceplate to the outlet box. In FIG. 6, the outlet box 611 and the template measurement tool 420 are shown without a wall. FIG. 7 illustrates a side view 700 of the temperate measurement tool 420 and the outlet box 611, e.g., when the outlet box is installed in a wall 713. FIG. 7 shows that the spacers 445 space the base piece 422 of the template measurement tool from the surface of the wall 713. At times, the position of the outlet box may be recessed at various depths relative to the surface of the wall, e.g., with some outlet boxes being more forward and others more recessed into, or angled relative to the wall during construction. The spacers 445 help to maintain the template measurement tool 420 at a consistent distance from the surface of the wall 713 and help to maintain the measurement surface extending from the wall, e.g., in a perpendicular direction, in order to provide more accurate and consistent measurements. FIG. 6 illustrates the extension placed so that the measurement surface with the reference point 430 showing. FIG. 7 shows the extension 424 placed in the opposite direction so that the measurement surface with the reference point 430 is not visible, and instead the portion of the extension 424 with the insertion pieces, e.g., 432, is visible.

FIG. 8 illustrates a front view 800 of the template measurement tool 420 applied to an outlet box shown with dashed lines. The outlet box may be visible through the base piece 422, e.g., if it comprises a transparent material. FIG. 8 illustrates a measurement tool 802 (e.g., which may correspond to 102, 202, or 302) and shows a measurement surface of t extension 424, e.g., by showing an example in which a light beam 804 is directed to, and measured from, the extension 424.

Figure 10:
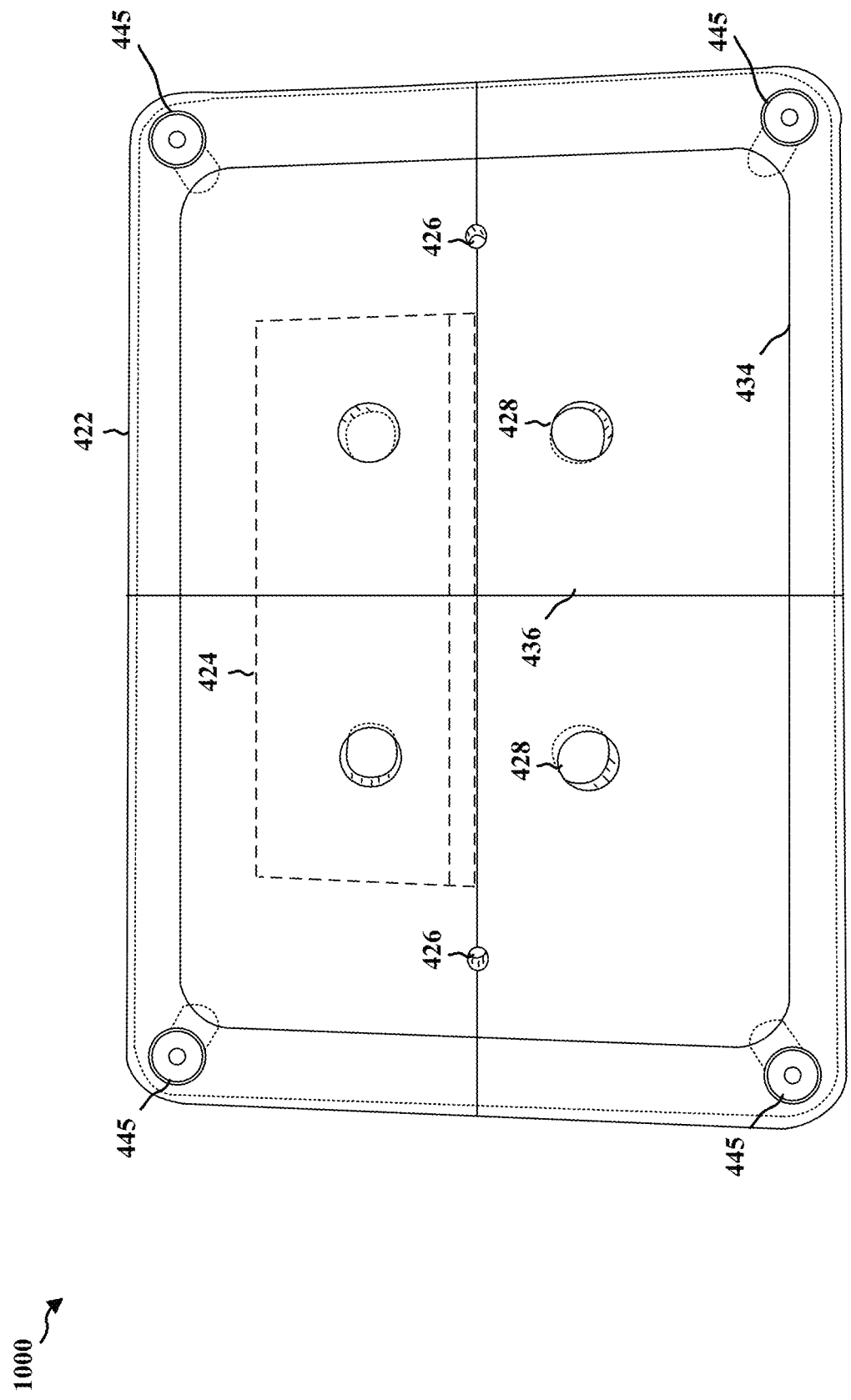
FIG. 10 is a diagram showing a front view of the base piece without the extension, and showing an example placement of the extension, in accordance with aspects of the present disclosure.
Figure 11C:
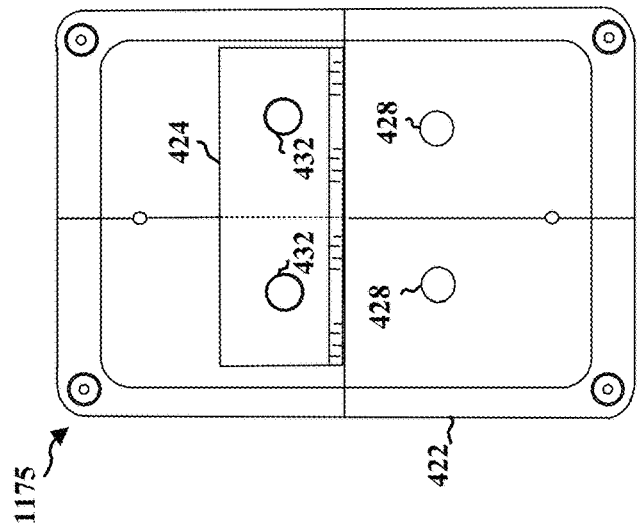
FIG. 11A, FIG. 11B, and FIG. 11C illustrate front views of a base piece and showing two examples of different placement options for the extension on the base piece, in accordance with aspects of the present disclosure.
Figure 11B:
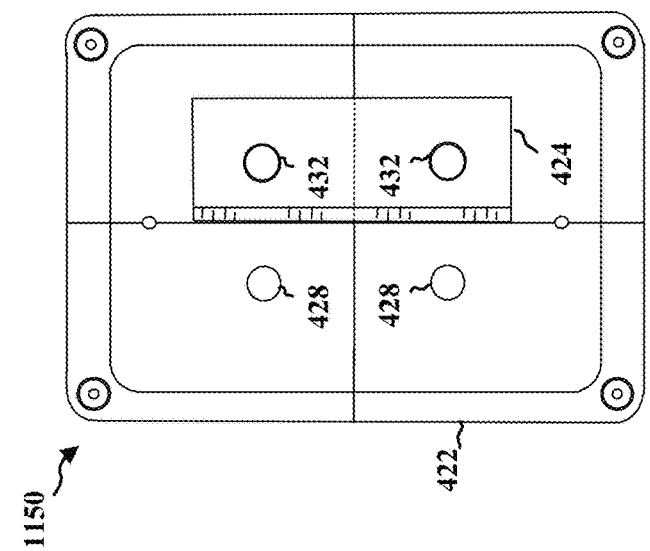
Figure 11A:
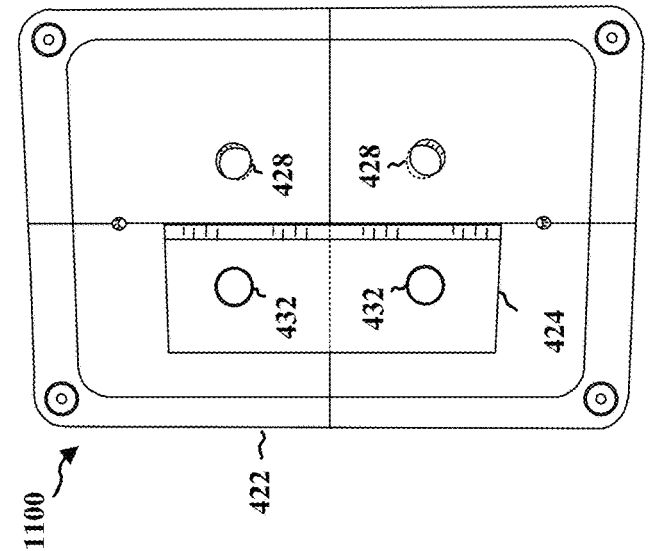
Figure 12A:
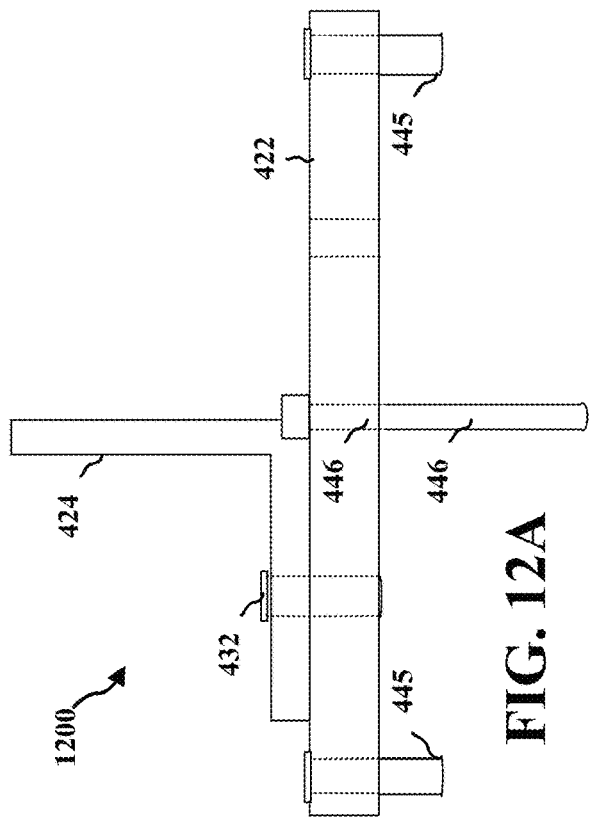
FIG. 12A and FIG. 12B illustrate end views of the base piece having the extension inserted at different placement options, in accordance with aspects of the present disclosure.
Figure 12B:
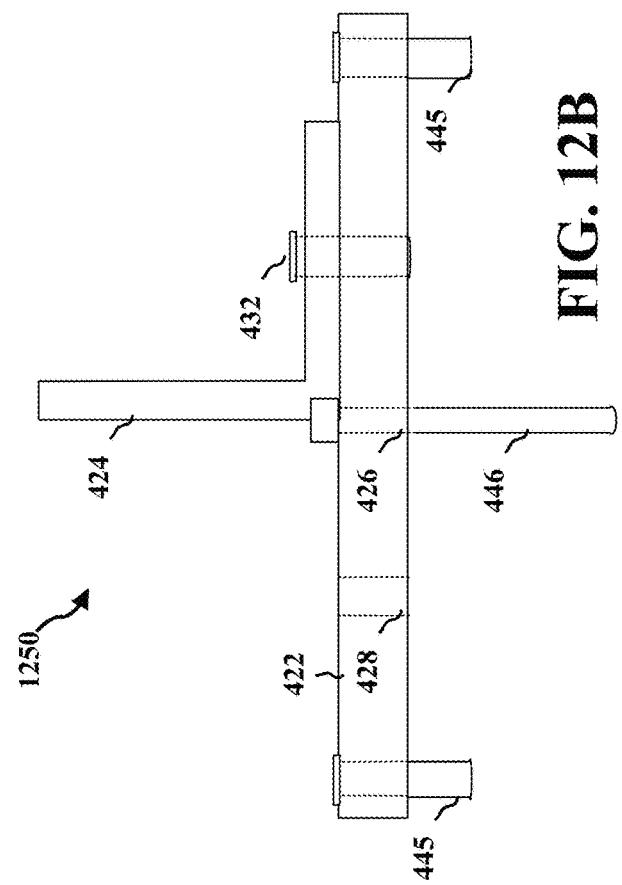

FIG. 9 is a diagram 900 showing a front view of the base piece 422 separate from an extension piece, e.g., without the extension 424 inserted. FIG. 10 is a diagram 1000 similarly showing a front view of the base piece 422 without the extension 424, and showing an example placement of the extension 424 with a dashed line. FIG. 11A, FIG. 11B, and FIG. 11C illustrate front views 1100, 1150, and 1175 of the base piece 422 and showing various examples of different placement options for the extension 424 on the base piece 422. The extension may be removably inserted into the base piece in order to allow for measurements from different directions. FIG. 12A and FIG. 12B illustrate end views 1200 and 1250 of the base piece 422 having the extension 424 inserted, or provided, positioned, or fixed, at different placement options, similar to FIGS. 11A and 11B.

Figure 13:
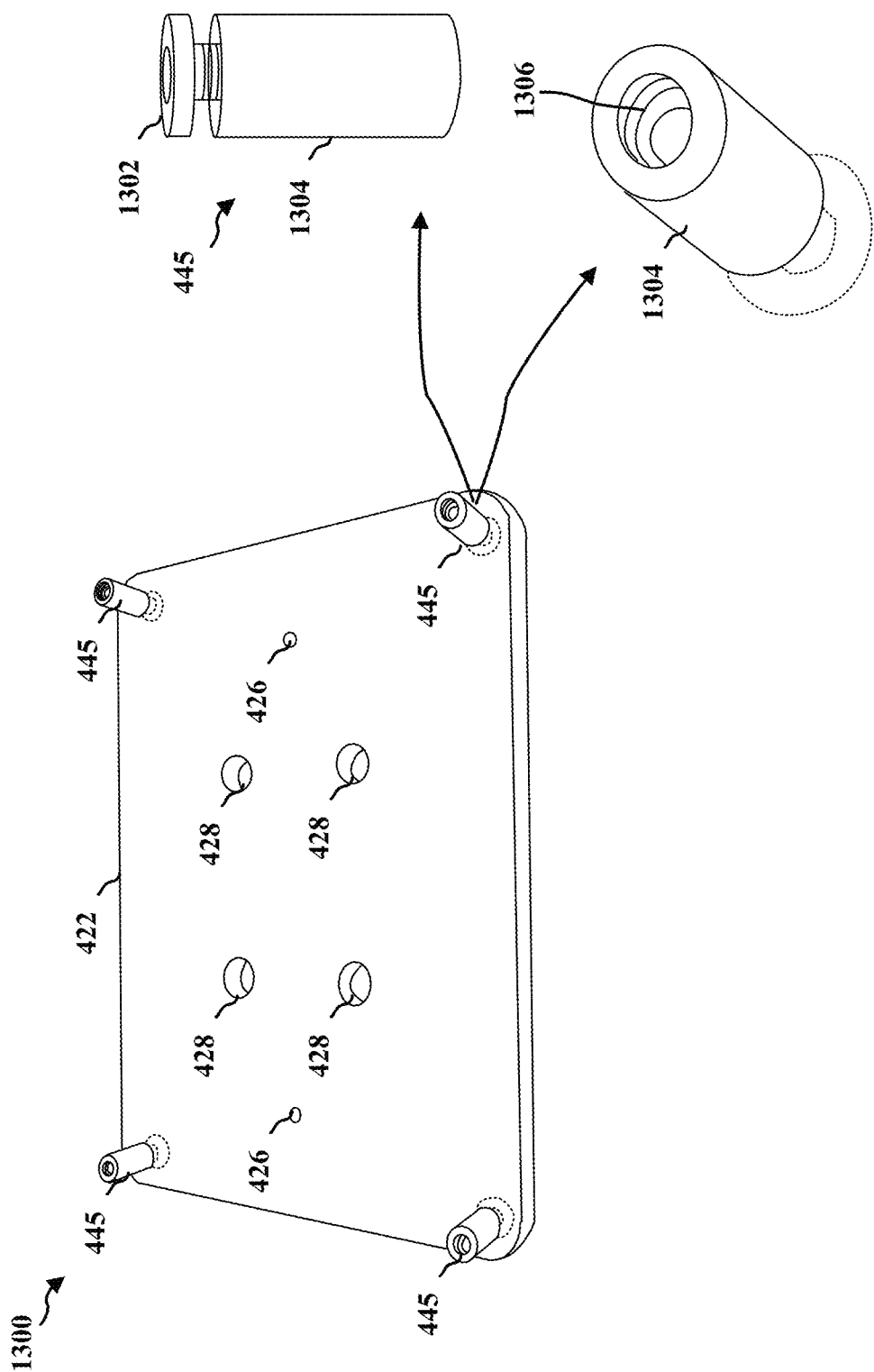
FIG. 13 illustrates a bottom view of the base piece with the spacers inserted or connected, in accordance with aspects of the present disclosure.

FIG. 13 illustrates a bottom view 1300 of the base piece 422 with the spacers 445 inserted or connected. FIG. 13 also illustrates a side view of an example spacer 445. The spacer may include a first portion 1302 that is inserted through the opening (e.g., 447 as shown in FIG. 9) of the base piece 422 and connected to a second portion 1304. In some aspects, the first portion 1302 may comprise a screw, and the second portion 1304 may include a threaded opening 1306 that receives the screw and holds or fastens the spacer 445 to the base piece 422.

Figure 14:
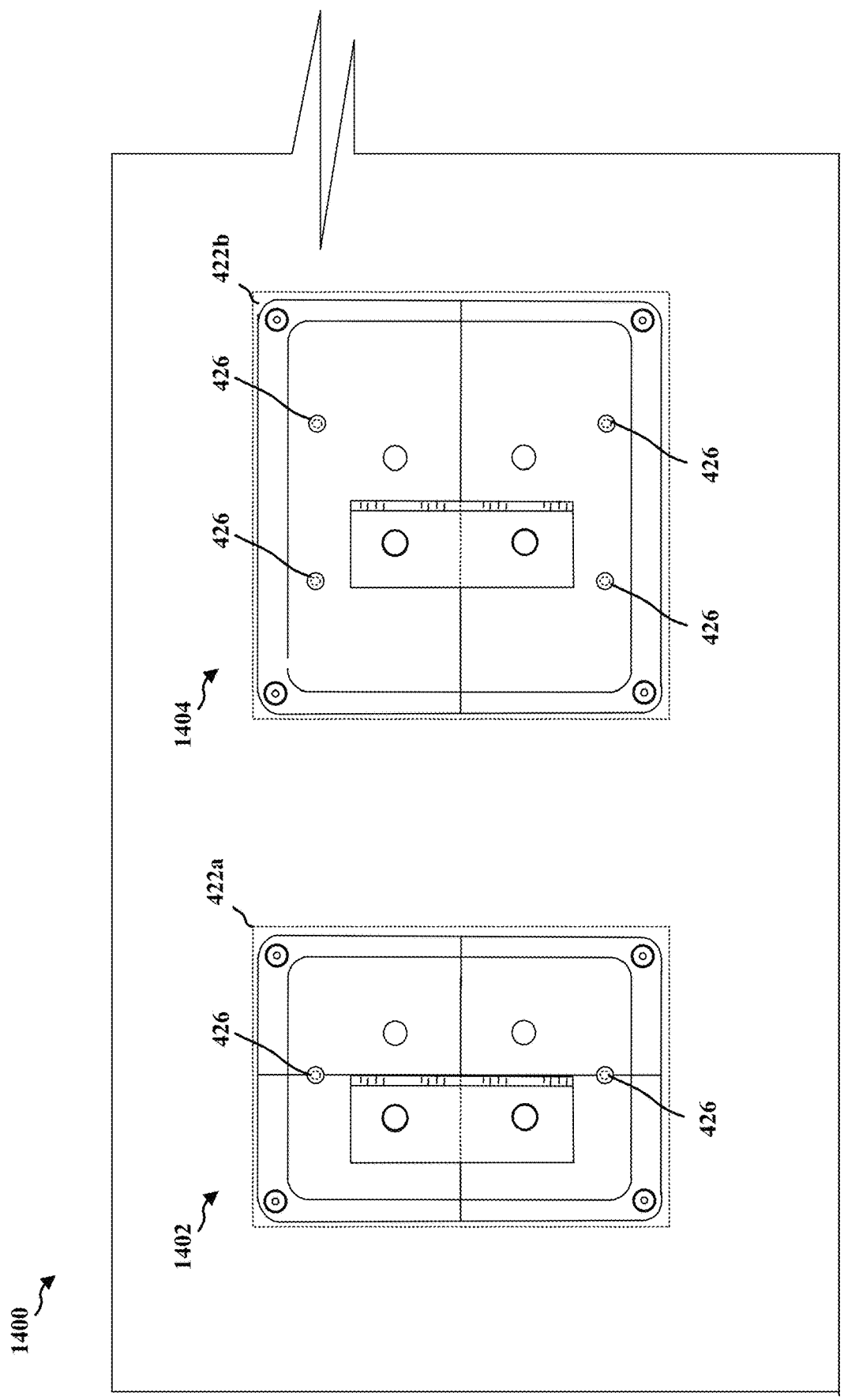
FIG. 14 illustrates a diagram different sizes of template measurement tools, in accordance with aspects of the present disclosure.

FIG. 14 illustrates a diagram 1400 showing a section of wall to be measured for a backsplash or counter piece and having two openings to be measured for electrical boxes or light switches. FIG. 14 illustrates that the openings to be cut for electrical outlets or switches may have different sizes. Similarly, the template measurement tool 420 may be formed in different sizes corresponding to the various sizes of outlet/switch openings. FIG. 14 illustrates a first template measurement tool 1402 having a smaller sized base piece 422a and having one set of openings for 426 connecting to an outlet box. FIG. 14 illustrates a second template measurement tool 1404 having a larger sized base piece 422b and having two sets of openings 426 for connecting to a larger sized outlet box or switch.

FIG. 15 illustrates an example template measurement tool 420 in which the extension 424 extends straight from the base piece 422 rather than having an L shape. The example 497 shows the extension 424 from an oblique view, and the example 495 shows a cross section of the extension 424.

Figure 16A:
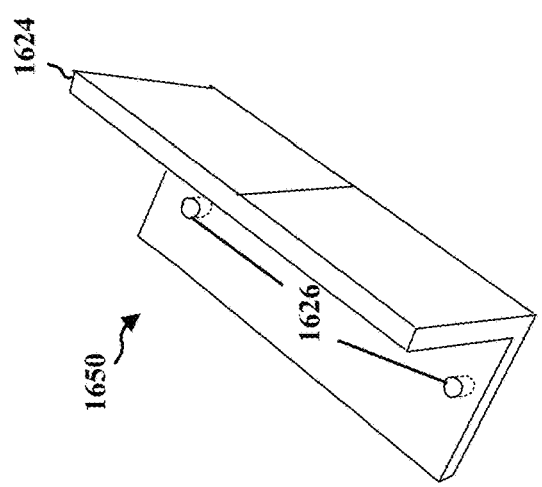

FIG. 16A illustrates an example template measurement tool 1650 that may include an extension 1624 that is configured to receive the pin or screw, e.g., 446, at openings 1626 in the extension 1624 to hold the extension to the outlet box for a measurement. The example shown at 1650 may provide for a simplified tool. However, the inclusion of a base piece 422 may help to provide improved spacing from the wall when making measurements. FIGS. 16B and 16C illustrate example template measurement tools 1675 and 1685 in which the base piece 1622 is formed integrally with the extension 1624.

In some aspects, the template measurement tool may part of a kit having multiple different extension 424 pieces and one or more base pieces 422 (e.g., for different sizes as shown at 1402 and 1404). In some aspects, the attachable extensions may provide different angle options for the reference point or measurement surface of the extension. FIG. 17 illustrates an example set of extensions 1710, 1720, 1730, 1740, 1750, and 1760 (e.g., similar to extension 424) and having different angle options. FIG. 17 also illustrates extensions 1770 and 1780 that provide different height options for the measurement surface.

Figure 18:
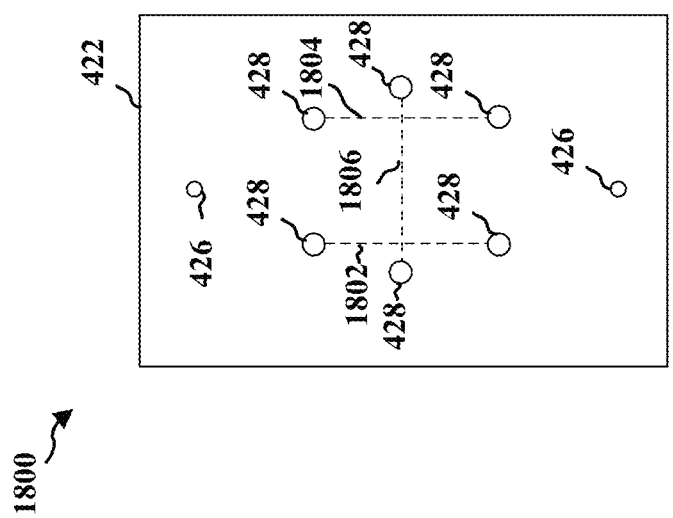
FIG. 18 illustrates an example base piece 422 for a template measurement tool, in accordance with aspects of the present disclosure.

FIG. 18 illustrates an example in which the base piece 422 may have various sets of openings 428 provided at different positions to provide a different measurement surface/direction when the extension is inserted into a corresponding set of openings. For example, if extension is placed in the set of openings 428 connected by dashed line 1806, the extension will extend in a position that is perpendicular to the position of the extension if placed in the set of openings connected by the line 1802 or connected by the line 1804.

FIG. 19A illustrates a diagram with another example of a template measurement tool 1920. Similar to the template measurement tool 420, the template measurement tool 1920 includes an extension 1924 to give a surface for a laser to strike in order to perform a more accurate measurement of a planar surface or area such as along a wall, such as shown in connection with FIG. 1. As an example, the extension may enable more accurate measurements along a wall, such as between a counter and cabinets, as one non-limiting example of a planar surface that may be measured for a counter or backsplash template. The extension may avoid a distortion or spreading of the beam and provide a more accurate measurement, e.g., as described in connection with FIGS. 2A and 2B. As an example, the spreading of the beam may occur based on the angle of the measurement device relative to the surface to be measured. As illustrated in FIG. 19, the tool may include a rounded extension that provides a more perpendicular surface for the beam to strike, which reduces distortion or spreading of the beam used by the measurement tool. In some aspects, the tool may be placed in a particular location in order to obtain a set of measurements, e.g., and may rotate or otherwise move to take various measurements. The movement of the tool may lead to various angles of the beam toward the surface to be measured. If the angle of the beam would lead to beam spreading at the intended measurement location, the template measurement tool may be placed to provide the extension at the intended measurement location. Various extensions, blocks, or other tools may be used to hold the template measurement tool at the desired location. Alternately, the template measurement tool may be manually held at the measurement point.

FIG. 19A illustrates an example in which the template measurement tool 1920 includes a base piece 1922 comprising planar body or substrate and an extension 1924 that extends from one surface of the base piece 1922. The planar shape of the base piece 1922 provides support and enables the template measurement tool to be positioned adjacent to, or against, a wall or flat surface. The extension 1924 in FIG. 19A-19D is illustrated as a cylindrical extension, which may have an opening 1931 between the base piece 1922 and the rounded extension piece. FIG. 19B illustrates an end view 1925 of the template measurement tool 1920. FIG. 19C illustrates a side view 1935 of the template measurement tool 1920. FIG. 19D illustrates an oblique view 1945 of the template measurement tool 1920. The extension 1924 may include one or more visual marking 1944 such as a line, a dot, or other visual mark that provides a target point for alignment with a light beam 1904 of a measurement tool 1902. FIG. 19A illustrates an example in which the base piece 1922 may include grooves or channels 1926. In some aspects, the grooves or channels may receive the extension 1924. The extension may be formed of a plastic material, a metal material, or another opaque material that provides a surface to reflect the beam 1904. In some aspects, the extension 1924 may be formed of a portion of a polyvinyl chloride (PVC) pipe or cylinder, and the base piece 1922 may be formed of a different material such as wood. In some aspects, the base piece 1922 and the extension 1924 may both be formed of the same material. In some aspects, the base piece 1922 and the extension 1924 may both be formed of a plastic, such as PVC. In some aspects, the base piece 1922 and the extension 1924 may be formed as a single, combined piece, e.g., from a unitary piece of material.

Figure 20C:
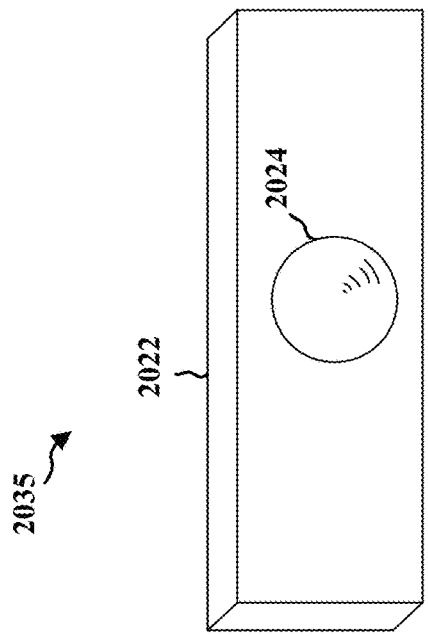
FIG. 20A, FIG. 20B, and FIG. 20C illustrate various example aspects of a template measurement tool having a partial spherical extension, in accordance with aspects of the present disclosure.
Figure 20B:
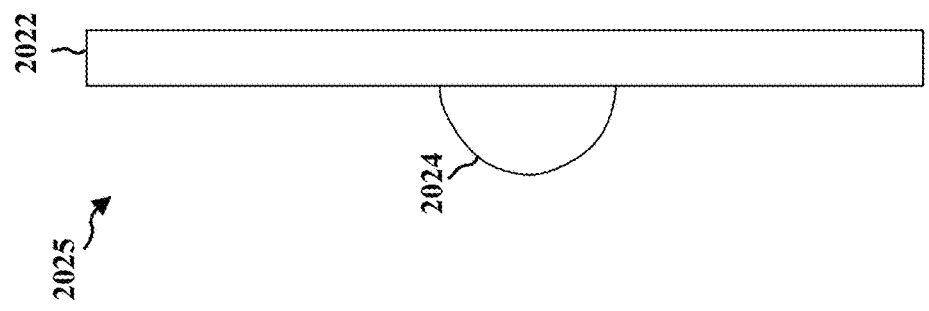
Figure 20A:
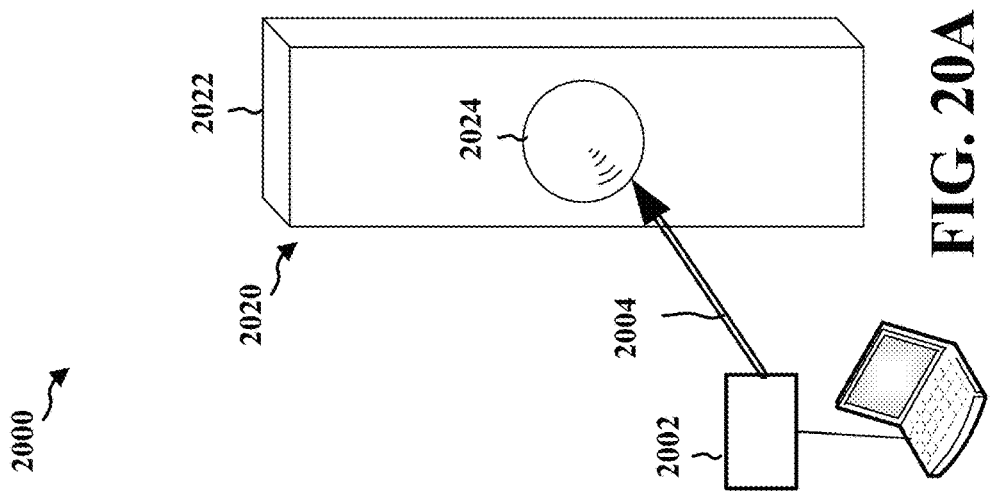

FIGS. 20A, 20B, and 20C illustrate different views of another example of a template measurement tool 2020 having a rounded extension piece, e.g., similar to FIGS. 19A-19D. However, in FIGS. 20A-20C, the extension 2024 is illustrated as having a spherical (or half-spherical) shape rather than the cylindrical shape of FIGS. 19A-D. FIG. 20A illustrates an oblique view 2000 of the template measurement tool 2020, and shows that the extension 2024 that extends from the base piece 2022 provides a surface for the beam 2004 of a measurement device 2002 to strike. FIG. 20B illustrates a side view 2025 of the template measurement tool 2020. FIG. 20C illustrates a view 2035 of the template measurement tool in a horizontal position rather than in a vertical position.

FIGS. 21A-21D illustrates various example aspects of a template measurement tool having a rounded extension 2124, similar to FIGS. 20A-C. FIGS. 21A and 21B illustrate that the base piece 2122 may include an edge extension 2126 in addition to the rounded extension 2124, which may include a visual marking 2144 to assist in alignment with a beam 2104 of a measurement device 2102. The edge extension 2126 may assist in positioning of the template measurement tool. For example, the edge extension 2126 may include a flat surface that can be placed in a corner, against a counter or cabinetry surface, etc. As well, the edge extension 2126 may provide added stability and support for having the tool maintain positioning during measurement. FIG. 21A illustrates a side, oblique view 2100 of the template measurement tool 2120. FIG. 21B illustrates a front view 2125 of the template measurement tool 2120. FIG. 21C illustrates a front view 2135 of the template measurement tool 2120 in a horizontal placement. FIG. 21D illustrates an oblique view 2145 of a template measurement tool 2121 similar to FIG. 21A, in which the edge extension 2128 extends outward from both sides of the base piece 2122.

Thus, as described herein, the template measurement tools and/or kits can provide improved measurements, avoid wasted materials such as stone that is cut to incorrect dimensions. The aspects of the template measurement tools also increase the case of measurements for the user in order to determine dimensions and/or for placement for openings in a counter or backsplash to allow for electrical outlets and/or switches.

The template measurement tools are designed to be easily transported to installation locations, and are designed with a small size and weight so that they can be easily carried by a user.

In some aspects, a kit may be provided that includes one or more template measurement tools and/or different modular or removable pieces for a single template measurement tool. As an example, a kit or system of template measurement tools may include two or more of the template measurement tools 420, 1920, 2020, 2120, or 2121. In some aspects, a template measurement tool may include a base piece such as 1922 with various types of removable extensions, e.g., 1924 and 2024. In some aspects, a single removable extension, e.g., 1924 or 2024, may be provided with different types of base pieces, e.g., 1922, 2022, and 2123. The removable extension 2124 may be inserted into a particular base piece based on the space or location to be measured.

Figure 22:
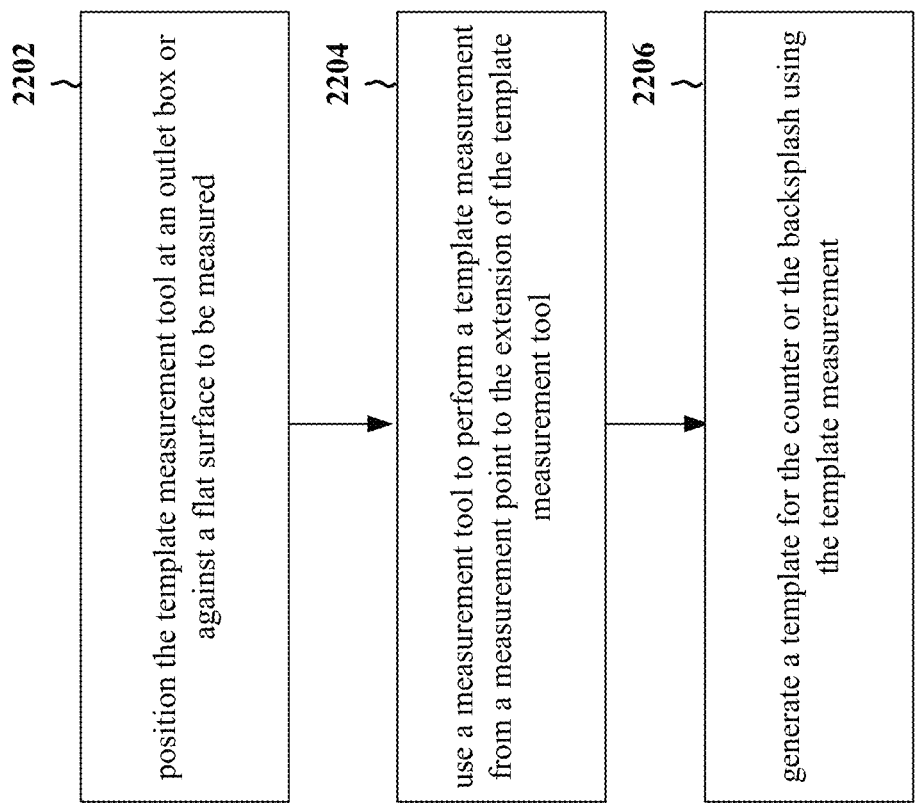
FIG. 22 illustrates a flowchart of a method of using a template measurement tool including aspects described herein.

FIG. 22 illustrates a flowchart showing a method of use of a template measurement tool. At 2202, a user positions the template measurement tool at an outlet box or against a flat surface to be measured, the template measurement tool comprising: a planar base piece; and an extension configured to extend from the planar base piece and in a direction perpendicular to the planar base piece to provide a measurement surface for a measurement in connection with a counter or a backsplash template. The template measurement tool may include any of the aspects described in connection with FIGS. 1 and 3A-21D. At 2204, the user uses a measurement tool, such as described in connection with FIG. 1 or 2A-3B, to perform a template measurement from a measurement point to the extension of the template measurement tool. At 2206, the user generates a template for the counter or the backsplash using the template measurement. The user may then use the template to cut a piece of material, such as stone, to the measured dimensions for the template. In some aspects, the user may position one or more template measurement tools at multiple positions and perform multiple measurements in order to generate the template. For example, the user may position a single measurement tool multiple times to measure locations of multiple outlet boxes, e.g., which may be for electrical outlets, electrical switches, etc. In other examples, the user may position multiple measurement tools at the different locations and then perform the measurements of the locations. The user may similarly position a template measurement tool, such as described in connection with FIGS. 19A-21D at different positions along a wall to obtain accurate measurements for the template.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C. B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a template measurement tool for template measurements for a counter or backsplash template, comprising: a planar base piece; and an extension configured to extend from the planar base piece and in a direction perpendicular to the planar base piece to provide a measurement surface for a measurement in connection with the counter or the backsplash template.

In aspect 2, the template measurement tool of aspect 1 further includes that the planar base piece comprises at least one alignment feature to align with an outlet box opening of an outlet box to be measured for the counter or the backsplash template, wherein the planar base piece is configured to present the extension at a center position relative to the outlet box when the at least one alignment feature is aligned with the outlet box opening. An outlet box may refer to a box for an electrical outlet or for an electrical switch.

In aspect 3, the template measurement tool of aspect 2 further includes that the at least one alignment feature includes one or more openings positioned to align with a threaded opening at the outlet box.

In aspect 4, the template measurement tool of aspect 2 or 3 further includes that the planar base piece comprises a transparent material, and the at least one alignment feature includes a visual mark shaped to align with an outline of the outlet box opening.

In aspect 5, the template measurement tool of any of aspects 2-4 further includes that the at least one alignment feature further includes a set of openings configured to align with threaded openings at the outlet box.

In aspect 6, the template measurement tool of aspect 5 further includes a set of pins, wherein the set of openings in the planar base piece are configured to receive the set of pins to position and hold the template measurement tool aligned with the outlet box.

In aspect 7, the template measurement tool of any of aspects 1-6 further includes that one or more spacers extending from a side of the planar base piece opposite the extension and outside of an outlet box opening, the one or more spacers being configured to maintain a spacing of the planar base piece parallel relative to a surface of a wall in which the outlet box is placed.

In aspect 8, the template measurement tool of aspect 7 further includes that the planar base piece comprises a rectangular size that is larger than a perimeter of the outlet box opening, wherein the rectangular size corresponds to a cover plate size for an outlet box, and the one or more spacers includes a spacer at each corner of the planar base piece.

In aspect 9, the template measurement tool of aspect 7 or 8 further includes that the one or more spacers are removably coupled to the planar base piece.

In aspect 10, the template measurement tool of any of aspects 1-9 further includes that the extension comprises a removable piece that is configured to removably couple to the planar base piece at one or more positions.

In aspect 11, the template measurement tool of aspect 10 further includes that the extension comprises: a first planar portion configured to be positioned against a surface of the planar base piece and having a set of insertion pieces configured to be received in a set of openings at the planar base piece; and a second planar portion configured to extend perpendicularly away from the surface of the planar base piece when the set of insertion pieces are inserted into the set of openings at the planar base piece.

In aspect 12, the template measurement tool of aspect 10 or 11 further includes that the extension comprises an L-shaped cross-section, and wherein the planar base piece comprises multiple sets of openings to receive the extension at different positions, each of the different positions having the measurement surface of the second planar portion of the extension facing in a different direction.

In aspect 13, the template measurement tool of aspect 1 further includes that the extension comprises a rounded surface comprising a partial cylindrical shape or partial spherical shape.

In aspect 14, the template measurement tool of aspect 13 further includes that the planar base piece comprises a rectangular piece of wood or plastic having the extension coupled on first surface and having a flat surface opposite the first surface.

In aspect 15, the template measurement tool of aspect 13 or 14 further includes an edge extension provided at each edge of the planar base piece.

In aspect 16, the template measurement tool of any of aspects 13-15 further includes at least one visual marking provided at a center position of the extension.

In aspect 17, the template measurement tool of any of aspects 13-16 further includes that the extension comprises a portion of a polyvinyl chloride (PVC) pipe coupled to the planar base piece comprising a piece of wood or PVC.

Aspect 18 is a method of use of a template measurement tool, comprising: positioning the template measurement tool at an outlet box or against a flat surface to be measured, the template measurement tool comprising: a planar base piece; and an extension configured to extend from the planar base piece and in a direction perpendicular to the planar base piece to provide a measurement surface for a measurement in connection with a counter or a backsplash template; using a measurement tool to perform a template measurement from a measurement point to the extension of the template measurement tool; and generating a template for the counter or the backsplash using the template measurement. The template measurement tool may include any of the aspects of aspects 1-17.

Aspect 19 is a template measurement kit comprising: a first template measurement tool comprising: a first planar base piece; and a planar extension configured to extend from the first planar base piece and in a direction perpendicular to the first planar base piece to provide a first measurement surface for a first measurement in connection with a counter or a backsplash template; and a second template measurement tool comprising: a second planar base piece; and a rounded extension extending from the second planar base piece to provide a second measurement surface for a second measurement in connection with the counter or the backsplash template.

In aspect 20, the template measurement kit of aspect 19 further includes that the first template measurement tool includes any of the aspects of aspects 1-12.

In aspect 21, the template measurement kit of aspect 19 or 20 further includes that the second template measurement tool includes any of the aspects of aspects 13-17.

In aspect 22, the template measurement kit of any of aspects 19-21 further includes multiple removable extension pieces configured to be received in at least one of the first template measurement tool or the second template measurement tool.

What is claimed is:

1. A template measurement tool for template measurements for a counter or backsplash template, comprising:
    a planar base piece configured to align with an outlet box opening of an outlet box to be measured for a counter or a backsplash template;
    an extension configured to extend from the planar base piece and in a direction perpendicular to the planar base piece to provide a measurement surface for a measurement in connection with the counter or the backsplash template, wherein the planar base piece is configured to present the extension at a center position relative to the outlet box opening and at a level with the outlet box opening when the planar base piece is aligned with the outlet box opening; and
    at least one alignment feature to align the planar base piece with the outlet box opening, wherein the at least one alignment feature includes at least one of:
        one or more circular openings in the planar base piece that align with one or more threaded openings at the outlet box when the planar base piece is aligned with the outlet box opening, or
        one or more cylindrical extensions that insert into the one or more threaded openings at the outlet box to maintain the planar base piece in alignment with the outlet box opening.

2. The template measurement tool of claim 1, wherein the planar base piece comprises a transparent material, and the at least one alignment feature further includes a visual mark shaped to align with an outline of the outlet box opening.

3. The template measurement tool of claim 1, wherein the at least one alignment feature includes a set of circular openings configured to align with a set of threaded openings at the outlet box.

4. The template measurement tool of claim 3, wherein the at least one alignment feature further comprises:
    a set of pins as the one or more cylindrical extensions configured to insert into the set of threaded openings at the outlet box, wherein the set of circular openings in the planar base piece are configured to receive the set of pins to removably position and hold the template measurement tool aligned with the outlet box.

5. The template measurement tool of claim 1, further comprising one or more spacers extending from a side of the planar base piece opposite the extension and outside of the outlet box opening, the one or more spacers being configured to maintain a spacing of the planar base piece parallel relative to a surface of a wall in which the outlet box is placed.

6. The template measurement tool of claim 5, wherein the planar base piece comprises a rectangular size that is larger than a perimeter of the outlet box opening, wherein the rectangular size corresponds to a cover plate size for the outlet box, and the one or more spacers includes a spacer at each corner of the planar base piece.

7. The template measurement tool of claim 6, wherein the one or more spacers are removably coupled to the planar base piece.

8. The template measurement tool of claim 1, wherein the extension comprises a removable piece that is configured to removably couple to the planar base piece at one or more positions.

9. The template measurement tool of claim 8, wherein the extension comprises:
 a first planar portion configured to be positioned against a surface of the planar base piece and having a set of insertion pieces configured to be received in a set of openings at the planar base piece; and
 a second planar portion configured to extend perpendicularly away from the surface of the planar base piece when the set of insertion pieces are inserted into the set of openings at the planar base piece.

10. The template measurement tool of claim 9, wherein the extension comprises an L-shaped cross-section, and wherein the planar base piece comprises multiple sets of openings to receive the extension at different positions, each of the different positions having the measurement surface of the second planar portion of the extension facing in a different direction.

11. The template measurement tool of claim 1, wherein the extension comprises a rounded surface comprising a partial cylindrical shape or partial spherical shape.

12. The template measurement tool of claim 11, wherein the planar base piece comprises a rectangular piece of wood or plastic having the extension coupled on first surface and having a flat surface opposite the first surface.

13. The template measurement tool of claim 12, further comprising:
 an edge extension provided at each edge of the planar base piece.

14. The template measurement tool of claim 11, further comprising:
 at least one visual marking provided at a center position of the extension.

15. The template measurement tool of claim 11, wherein the extension comprises a portion of a polyvinyl chloride (PVC) pipe coupled to the planar base piece comprising a piece of wood or PVC.

16. A method of use of a template measurement tool, comprising:
 positioning the template measurement tool at an outlet box or against a flat surface to be measured, the template measurement tool comprising:
  a planar base piece configured to align with an outlet box opening of the outlet box to be measured for a counter or a backsplash template;
  an extension configured to extend from the planar base piece and in a direction perpendicular to the planar base piece to provide a measurement surface for a measurement in connection with the counter or the backsplash template, wherein the planar base piece is configured to present the extension at a center position relative to the outlet box opening and at a level with the outlet box opening when the planar base piece is aligned with the outlet box opening; and
  at least one alignment feature to align the planar base piece with the outlet box opening, wherein the at least one alignment feature includes at least one of:
   one or more circular openings in the planar base piece that align with one or more threaded openings at the outlet box when the planar base piece is aligned with the outlet box opening, or
   one or more cylindrical extensions that insert into the one or more threaded openings at the outlet box to maintain the planar base piece in alignment with the outlet box opening;
 using a measurement tool to perform a template measurement from a measurement point to the extension of the template measurement tool; and
 generating a template for the counter or the backsplash using the template measurement.

17. A template measurement kit comprising:
 a first template measurement tool comprising:
  a first planar base piece configured to align with an outlet box opening of an outlet box to be measured for a counter or a backsplash template;
  a planar extension configured to extend from the first planar base piece and in a direction perpendicular to the first planar base piece to provide a first measurement surface for a first measurement in connection with the counter or the backsplash template, wherein the first planar base piece is configured to present the extension at a center position relative to the outlet box opening and at a level with the outlet box opening when the first planar base piece is aligned with the outlet box opening; and
  at least one alignment feature to align the first planar base piece with the outlet box opening, wherein the at least one alignment feature includes at least one of:
   one or more circular openings in the first planar base piece that align with one or more threaded openings at the outlet box when the first planar base piece is aligned with the outlet box opening, or
   one or more cylindrical extensions that insert into the one or more threaded openings at the outlet box to maintain the first planar base piece in alignment with the outlet box opening; and
 a second template measurement tool comprising:
  a second planar base piece; and
  a rounded extension extending from the second planar base piece to provide a second measurement surface for a second measurement in connection with the counter or the backsplash template.

18. The template measurement kit of claim 17, further comprising:
 multiple removable extension pieces configured to be received in at least one of the first template measurement tool or the second template measurement tool.

19. The template measurement tool of claim 1, wherein the extension extends in the direction perpendicular to the planar base piece and a wall to provide the measurement surface for a beam of a digital measurement tool to strike as part of measurement of the counter or the backsplash template.

20. The template measurement tool of claim 1, wherein the one or more cylindrical extensions are configured to screw into the one or more threaded openings at the outlet box.

* * * * *